United States Patent [19]
Cotton et al.

[11] Patent Number: 6,076,074
[45] Date of Patent: Jun. 13, 2000

[54] SYSTEM AND METHOD FOR INTRADAY NETTING PAYMENT FINALITY

[75] Inventors: Robert M. Cotton, New York; George F. Thomas, Oakdale, both of N.Y.; Joseph S. Pawelczyk, Morris Plains, N.J.

[73] Assignee: The Clearing House Service Company L.L.C., New York, N.Y.

[21] Appl. No.: 09/305,311

[22] Filed: May 5, 1999

Related U.S. Application Data

[60] Provisional application No. 60/084,223, May 5, 1998.

[51] Int. Cl.[7] .................................................. G06F 17/60
[52] U.S. Cl. ................................................ 705/40; 705/35
[58] Field of Search ................................ 705/1, 35, 39, 705/40

[56] References Cited

U.S. PATENT DOCUMENTS

| | | | |
|---|---|---|---|
| 5,262,942 | 11/1993 | Earle | 364/408 |
| 5,465,206 | 11/1995 | Hilt et al. | 364/406 |
| 5,649,117 | 7/1997 | Landry | 395/240 |
| 5,677,955 | 10/1997 | Doggett et al. | 380/24 |

OTHER PUBLICATIONS

"Fedpoint 43: Fedwire", Federal Reserve Bank of New York, Oct. 1996.
"Electronic Clearing Frankfrut (EAF 2)—Objective and Design", Deutsche Bundesbank §§1–4.5.3, Nov. 1995.
"CHIPS Systems and Operational Manual", The New York Clearing House, Sections II and V, Sep. 30, 1995.
Peter ChiKeung Lee and Sumit Ghosh, "NOVAHID: A Novel Architecture for Asynchronous, Hierarchical, International, Distributed, Real–Time Payments Processing", IEEE Journal of Selected Areas in Communications, vol. 12, No. 6, Aug. 1994.
External Specifications for Electronic Access to the Deutsche Bundesbank, Version k3.1, Chapters I–III, Sep. 1, 1994 (English).
"CHIPS to introduce real–time settlement and S.W.I.F.T.–based FEDI", SWIFT Watcher, No. 25, Mar. 1998, pp1 and 4–.
"CHIPS Developing Global Financial EDI", Corporate Eft Report, vol. 18, No. 2, Feb. 4, 1998, pp. 1–3.
Slide Presentation, May 1997.

*Primary Examiner*—James P. Trammell
*Assistant Examiner*—Yehdega Retta
*Attorney, Agent, or Firm*—Fitzpatrick, Cella, Harper & Scinto

[57] ABSTRACT

A system is provided for continuous intraday final settlement of payment orders among a plurality of financial-institution participants. The system includes a central controlling agent, including a central computer operable to communicate electronically with satellite computer stations of the plurality of participants to receive payment orders therefrom, and to control release of payments among the plurality of participants; and means for storing a plurality of prefunded balances in a prefunded balance account, each balance representing the right of one of the participants to payment from the prefunded balance account and containing an initial prefunded balance for each participant at the start of each business day.

27 Claims, 6 Drawing Sheets

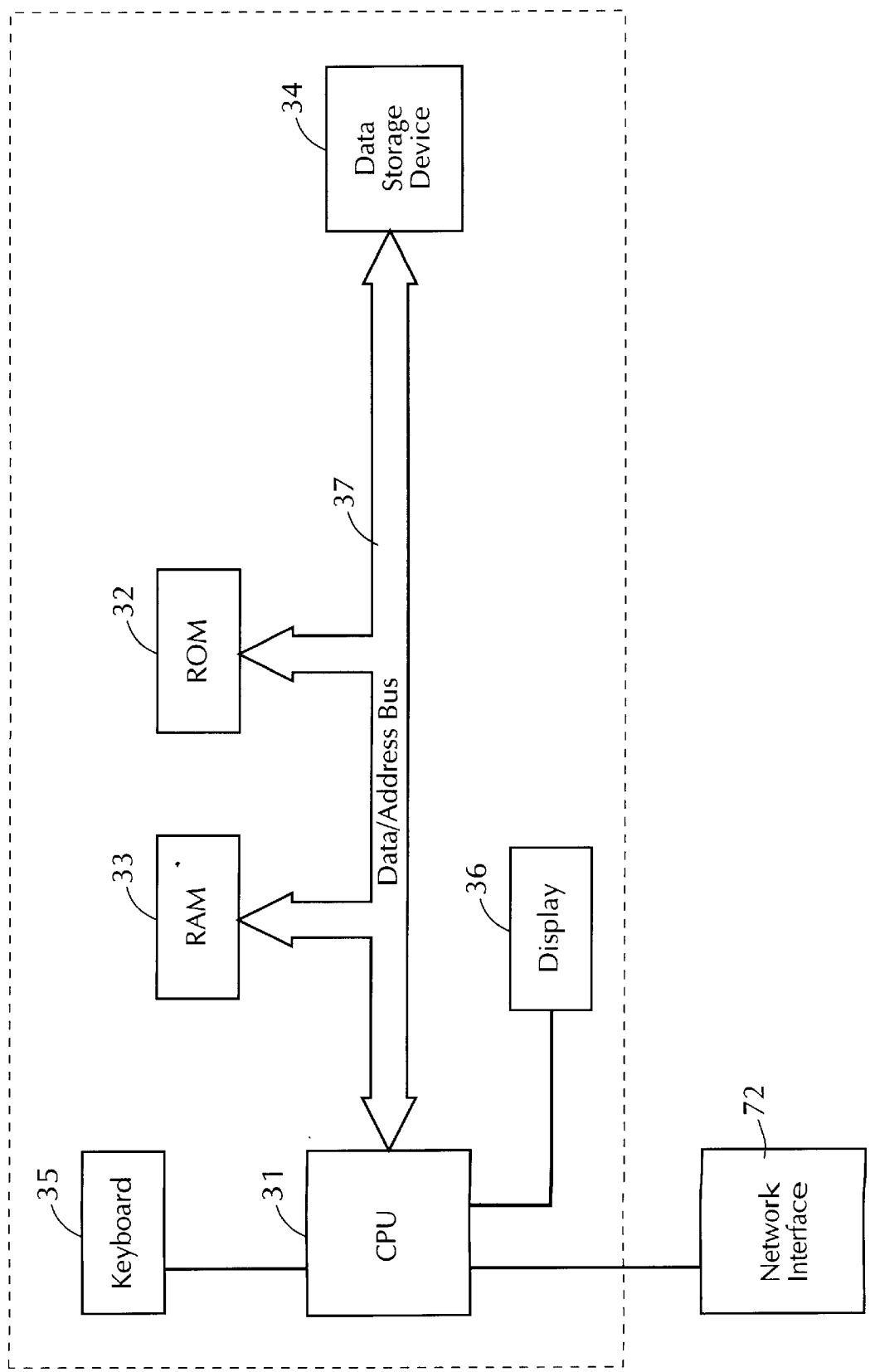

Overall view of procedure GALESHAPLEY. The sender bids case is shown.

SYSTEM AND METHOD FOR INTRADAY NETTING PAYMENT FINALITY

CROSS-REFERENCE TO RELATED APPLICATIONS

This application claims benefit of U.S. Provisional Application No. 60/084,223, filed May 5, 1998, which is hereby incorporated by reference.

BACKGROUND OF THE INVENTION

I. Field of the Invention

The invention relates to a system and method of receiving and transmitting electronic payments between and among financial institutions in which payments are final when transmitted.

II. Description of the Related Art

A person (individual or corporate) making a payment in the United States has an array of payment instruments from which to choose. It is likely that most single transactions still are paid for in cash (coin and currency). There are also checks and other paper instruments (travelers' checks, money orders, and official checks) and debit and credit entries processed by automated clearing houses ("ACH", a computer based, batch processing electronic payment mechanism that supports both credit and debit transfers and is used primarily for low-dollar transactions such as direct deposit of payroll and benefit payments and mortgage and insurance premium payments that can be scheduled some time in advance and that are not time-critical). The largest payments, however, usually are sent by funds transfers. Each day, the two principal funds transfer systems, Fedwire and CHIPS ("Clearing House Interbank Payments System"), transfer hundreds of thousands of payments worth more than $2 trillion. The average size of a funds transfer is very large—about $6 million on CHIPS and $3 million on Fedwire.

Funds transfers can involve a number of different parties. Many transfers take place to settle obligations of two banks, such as the delivery or return of "fed funds" (a bank's deposits with its Federal Reserve Bank). In these cases, only the two banks will be involved. Banks also transfer funds on behalf of customers. These transfers may be to another person, either at the same bank or at another bank. Sometimes a customer will move funds between two of its own accounts, either at different banks or at the same bank, for example, from local accounts used to collect bills to a cash concentration account or to a payroll account.

A funds transfer may involve a single bank (a "book-transfer") or it may involve several. In most cases, the originator will not specify the method for carrying out his payment order, and the originator's bank will select the most efficient way to have the funds sent to the beneficiary, including choosing a network or intermediary bank.

For simplicity in analyzing how the funds transfer system works, one example will be used: Customer X orders his bank, Bank A, to pay $10,000 to the account of Customer Y at Bank B. The following will look at the different stages of the funds transfer and the various options open to the parties at each stage: How Customer X transmits the payment order to Bank A; how Bank A transmits the payment order to Bank B; how Bank B notifies Customer Y and makes the funds available to him; and how Banks A and B settle their balances.

A. Origination Of Funds Transfer

There are many ways for a person to order his bank to send a funds transfer. Probably the largest number of funds transfers, and certainly those involving the highest monetary value, are those originated by corporations with a direct computer-to-computer link to the bank. In these cases, the customer enters the payment instructions into his computer, and the computer sends the payment order directly to his bank's computer. The bank's computer "edits" the payment order. If the payment order fails one of the edits, for example, if mandatory information has not been included in the payment order, the computer routes the payment order to an operator's screen, and the operator makes any necessary corrections or seeks (or has someone else in the bank seek) clarification from the customer. A similar procedure is used for customers that use a personal computer to transmit payment messages to the bank.

Individuals generally must go to the bank to fill out a form and pay a fee for a funds-transfer service. Individuals with large bank balances and small companies may have a personal banker or account officer. To send a funds transfer, these persons telephone the officer and give the transfer instructions, usually after the authenticity of the call has been established through code word or call-back procedures. The officer either enters the payment order directly into the bank's computer at his own computer terminal or fills out a form for delivery to the bank's funds transfer department where it is entered in the bank's computer. Many banks are now offering "home banking" products that allow individual consumers to deal directly with the bank's computer by way of their own personal computers.

B. Originator's Bank's Acceptance Of Payment Order

Once the payment order has been entered into the bank's funds-transfer computer system and passes the initial edits, it is checked against the customer's demand account balance. If the balance is sufficient, the bank executes the payment order by issuing a corresponding payment order to a funds-transfer network or the next bank in the funds transfer. If the customer does not have a sufficient balance in his account, the computer checks to see if the customer has an available credit line. If so, the payment is released; if not, the payment is held pending receipt of funds to cover the payment. If covering funds have not been received by the late afternoon (usually 2:00 to 4:00 P.M.), the payment order may be referred to a credit officer who will decide whether to extend additional credit to the customer to enable the payment to be made.

If a payment order has not been sent on by the end of the execution date (the date that the bank may properly issue a payment order in execution of the sender's order), the bank will normally reject it by sending a notice of the rejection to the sender.

C. Transfers Between Banks

If there is more than one bank involved in a funds transfer, it is necessary for funds to be moved from one bank to the other. In the U.S., this can be accomplished by using one of the two large-dollar funds transfer networks to be discussed below, or through the adjustment of correspondent balances.

1. FEDWIRE

Fedwire is the funds transfer network operated by the 12 Federal Reserve Banks. It is a real-time, gross settlement system, meaning that the payment is final and irrevocable at the time the Federal Reserve Bank credits the account on its books of the receiving bank. There is thus no risk that the receiving bank will suffer a loss if it makes the funds available to the beneficiary and the sender cannot pay the amount of the payment order to its Federal Reserve Bank. In such a case, the Federal Reserve Bank would suffer the loss, not the receiving bank.

Fedwire is available to any depository institution that has a reserve or clearing account at a Federal Reserve Bank. There are currently about 10,000 such institutions. About 7,000 of these institutions have an "on-line" connection to their Federal Reserve Banks, most through a "Fedline" terminal linked to the Federal Reserve Bank by dial-up telephone connections or leased lines; about 200 of the largest institutions have direct computer-to-computer interfaces. An institution with an on-line connection may send and receive Fedwire payment orders to and from the Fedwire computer automatically without manual processing by Federal Reserve Bank personnel. The Federal Reserve Bank will send a computer message to the sender acknowledging the payment order. About 99 percent of Fedwire transfers originate with on-line payment orders.

"Off-line" transactions usually require the sender to telephone its Federal Reserve Bank, with the payment order authenticated by the use of codes or other procedures established by the Federal Reserve Bank. These telephone calls are also tape recorded. Following authentication, Federal Reserve Bank personnel enter the payment order into the Fedwire computer. Because of the manual processing involved, the Federal Reserve Banks charge significantly more for off-line transfers than for on-line ones.

A payment order received by a Federal Reserve Bank is routed to a Fedwire processing computer. This computer performs system edits and routes the payment order to the receiving Federal Reserve Bank, which automatically credits the receiving bank's account and sends an advice to the receiving bank.

Example 1 below shows the progress of a funds transfer involving a Fedwire payment order, noting the appropriate accounting entries. Settlements between Federal Reserve Banks are also discussed below.

EXAMPLE 1

Fedwire transfer involving two Federal Reserve Banks, in which Customer X orders Bank A to pay $10,000 to Customer Y of Bank B.

Step 1: Customer X sends payment order to Bank A; Bank A debits Customer X's account and sends Fedwire payment order to FRB1.

| Bank A | |
|---|---|
| Assets | Liabilities |
| Due from FRB −10,000 | Deposits Customer X −10,000 |

Step 2: FRB1 debits Bank A's reserve account and sends payment order to FRB2.

| FRB 1 | |
|---|---|
| Assets | Liabilities |
| Interdistrict settlement account −10,000 | Deposits Bank A −10,000 |

Step 3: FRB2 receives payment order and credits Bank B's account and sends advice to Bank B instructing it to pay Customer Y.

| FRB 2 | |
|---|---|
| Assets | Liabilities |
| Interdistrict settlement account +10,000 | Deposits Bank B +10,000 |

Step 4: Bank B credits Customer Y's account and sends advice of credit. Both Bank B and Customer Y have received final funds and the payment is final.

| Bank B | |
|---|---|
| Assets | Liabilities |
| Due from FRB2 +10,000 | Deposits Customer Y +10,000 |

2. CHIPS

The Clearing House Interbank Payments System ("CHIPS") is a funds-transfer system operated by The Clearing House Interbank Payments Company L.L.C. ("Clearing House"). It is a multilateral net settlement system, meaning that a bank that sends a CHIPS payment message to another participant incurs an obligation to pay the receiving participant the amount of the transfer but that this obligation is netted against the obligation of the other participant to pay the first participant, giving each participant a net credit position or a net debit position. When one participant settles for others, its position is netted against the net positions of each other participant for which it settles, giving each settling CHIPS participant a single "net net" position (credit or debit). These positions are settled at the end of the day. While it is theoretically possible for a participant with a net debit position to fail before it is able to settle its obligation, the Clearing House has instituted stringent credit controls and settlement assurance methods, and in 25 years of operation CHIPS has never failed to settle.

CHIPS is open to commercial banking institutions with offices in the United States. There are currently 83 active participants, 18 of which are settling participants. Each participant that is not a settling participant must arrange with a settling participant to settle on its behalf. (The specifics of the CHIPS settlement will be discussed below.)

In a typical CHIPS transfer, Bank A sends a payment message from its computer directly to the CHIPS computer over leased, dedicated telephone lines. The CHIPS computer authenticates and edits the payment message and sends a corresponding payment message to Bank B and an acknowledgement to Bank A. Example 2 shows a CHIPS transfer with appropriate accounting entries.

EXAMPLE 2

CHIPS transfer in which Customer X orders Bank A to pay $10,000 to Customer Y at Bank B.

Step 1: Customer X sends payment order to Bank A.

Step 2: Bank A sends payment message to Bank B via CHIPS.

| Bank A | |
|---|---|
| Assets | Liabilities |
| Note: Obligation to pay $10,000 which is offset by obligation of Bank B to pay for its transfers to Bank A. | Deposits<br>Customer X −10,000 |

| Bank A | |
|---|---|
| Assets | Liabilities |
| Note: Entitlement to receive $10,000 from Bank A, which is offset by Bank B's obligation to pay for its transfers to Bank A. | Deposits<br>Customer Y +10,000 |

Step 3: Bank B notifies Customer Y that it has received $10,000 for his account.

Note: Although Bank B may give Customer Y use of the funds, the payment is not final until settlement has taken place.

Step 4: Settlement.

3. Correspondent Balances

If a bank has a correspondent relationship with the bank holding the beneficiary's account, or if the bank does not have direct access to a funds transfer network, it may use debits and credits to various correspondent accounts to complete a funds transfer. Often a bank will send a payment order over the network operated by the Society for Worldwide Interbank Financial Telecommunication ("S.W.I.F.T."), with payment of the sender's obligation effected through adjustment of correspondent balances or other means. Payment orders may also be sent by telex or other communications medium. The actual mechanics of performing these transactions will vary from bank to bank.

Examples 3 and 4 below show two different ways in which a funds transfer can be completed using a correspondent account.

EXAMPLE 3

Customer X orders Bank A to send $10,000 to Customer Y's account at Bank B. Bank A has correspondent account at Bank B.

Step 1: Customer X sends payment order to Bank A.

Step 2: Bank A debits Customer Y's account and sends payment order to Bank B authorizing Bank B to debit Bank A's account.

| Bank A | |
|---|---|
| Assets | Liabilities |
| Due from Bank B −10,000 | Deposits<br>Customer X −10,000 |

Step 3: Bank B debits Bank A's account and credits Customer Y's account.

| Bank B | |
|---|---|
| Assets | Liabilities |
| | Deposits<br>Bank A −10,000<br>Customer Y +10,000 |

Step 4: Bank B informs Customer Y that the funds are available.

EXAMPLE 4

Customer X orders Bank A to send $10,000 to Customer Y's account at Bank B. Bank A holds correspondent account for Bank B.

Step 1: Customer X sends payment order to Bank A.

Step 2: Bank A debits Customer X's account and credits Bank B's account.

| Bank A | |
|---|---|
| Assets | Liabilities |
| | Deposits<br>Bank B +10,000<br>Customer X −10,000 |

Step 3: Bank A sends payment order to Bank B.
Step 4: Bank B credits Customer Y's account.

| Bank B | |
|---|---|
| Assets | Liabilities |
| Due from A +10,000 | Deposits<br>Customer Y +10,000 |

Step 5: Bank B informs Customer Y that the funds are available for use.

4. Book Transfers

A customer may ask his bank to transfer funds from his account and pay another account on the books of the same bank (either another customer's account or a different account of the ordering customer). These are called book transfers because they take place on the books of a single bank. Procedures used to effect these transfers and record-keeping arrangements vary from bank to bank. Example 5 shows the accounting entries for a book transfer.

EXAMPLE 5

Customer X orders Bank A to transfer funds to the account of Customer Y on Bank A's books.

| Bank A | |
|---|---|
| Assets | Liabilities |
| | Deposits<br>Customer X −10,000<br>Customer Y +10,000 |

D. Paying The Beneficiary

The last step in the process of a funds transfer is paying the beneficiary. In all but a small number of cases, this is accomplished when the beneficiary's bank credits the beneficiary's account on its books and allows the beneficiary use of the funds. Under Federal Reserve Board regulations, a bank must make the proceeds of a funds transfer available to the beneficiary no later than the opening of business on the day after the bank has received final payment. For Fedwire payments, final payment occurs when the amount of the payment order is credited to the receiving bank's account at the Federal Reserve Bank or when notice of the credit is sent, whichever occurs first. For CHIPS transfers, final payment occurs when settlement is completed. For transfers using a correspondent account in which the sender credits the account on its books of the receiving bank (Example 4), final payment occurs when the credit is withdrawn or, if it is not withdrawn, at midnight of the day on which the credit is withdrawable and the receiving bank learns of the fact. Where the receiving bank debits the sender's account (Example 3), final payment occurs when the debit is made to the extent the debit is covered by a withdrawable credit in the account.

For a very small number of payments, the beneficiary's bank may use methods other than a credit to the beneficiary's account. For example, a bank may hold funds to be paid to the beneficiary upon presentation of proper identification, or the bank may pay a beneficiary by sending a check.

E. Interbank Settlements

Both of the above-mentioned major funds-transfer systems in the United States provide for settlement, i.e., the actual transfer of value in good funds that results in final payment. Once settlement is accomplished, payments are irrevocable (except in cases of duplicate or erroneous payments). The actual mechanics of the settlement in Fedwire and CHIPS differ, reflecting the differences between a real-time, gross settlement system operated by the central bank and a privately operated multilateral netting system.

1. FEDWIRE

From the point of view of a bank that sends a payment order to or receives a payment order from a Federal Reserve Bank, Fedwire funds transfers are final when made. The sender's Federal Reserve Bank debits the sender's account as of the time the Federal Reserve Bank acts on the payment order. The receiving bank receives final payment when its Federal Reserve Bank credits its account or sends an advice of credit, whichever is earlier. At this point, the beneficiary has been paid, and the originator's obligation to pay the beneficiary is discharged. The receiving bank has good funds in its reserve or clearing account that can be withdrawn and that counts towards fulfillment of the bank's required reserve balance.

Viewed from the inside, however, Fedwire is a net settlement system involving 12 settling banks, each of which is a separate corporation with its own balance sheet, and transactions must be settled among these banks. For this purpose, the Federal Reserve Board maintains interdistrict settlement accounts for the Federal Reserve Banks. This account appears on each Federal Reserve Bank's balance sheet. Each transaction between Federal Reserve Banks results in a credit to the interdistrict settlement account of one Federal Reserve Bank and a corresponding debit to the other's. As a result of the accumulated debits and credits, each Federal Reserve Bank has an accumulated position that is either a debit or a credit, and on the consolidated balance sheet of all 12 Federal Reserve Banks, these debits and credits net to zero. Once each year the interdistrict settlement account of each Federal Reserve Bank is brought to zero by the reallocation of the Federal Reserve Bank's ownership interest in the System Open Market Account—the consolidated holdings of all Federal Reserve Banks' government securities.

One disadvantage of Fedwire is that all participants in the system in good standing can incur a large daylight overdraft position. Banks incurring such overdrafts are charged a fee by the Federal Reserve.

2. CHIPS

In contrast, CHIPS, as it is currently configured, is a true multilateral net settlement system. As explained above, the release of a payment message creates an obligation to settle that is netted against the obligation of the receiving participant to settle for payments that it sent. Each bank thus has an overall net position that is either a debit or credit.

At the end of each day, each participant receives a report showing the total value of all payment messages sent, the total value of all payment messages received, and a net figure (debit or credit) showing the difference. Each settling participant receives a report showing in addition to its own position, the net position of each participant it settles for and an aggregate balance showing an overall net position that includes its own position and the positions of each participant it settles for. Each settling participant is then given 45 minutes within which it must notify the Clearing House if it decides not to settle for one or more of the participants for which it is the designated settling participant. Once the agreement to settle on the basis of the report has been received from each settling participant, the Clearing House instructs the Federal Reserve Bank of New York to open the CHIPS settlement account that it holds on behalf of all CHIPS settling participants and sends a notice to all settling participants that settlement may begin. After this notice has been sent, each settling participant that has an aggregate net debit position has 15 minutes to send a Fedwire funds transfer in the amount of its debit position to the CHIPS settlement account at the Federal Reserve Bank of New York. Once all these Fedwires have been completed, the Clearing House checks the balance in the account and then sends Fedwire payment orders from the settlement account to the accounts of those settling participants that are in a net credit position. Once all of these Fedwire payment orders have been sent, settlement is complete, and all CHIPS payments made that day are finally paid.

A multilateral net settlement system that provides for settlement at the end of the day is subject to the risk that a participant with a net debit position (a "debtor participant") would be unwilling or unable to pay its settlement obligation. Absent some measures to make up for the debtor participant's failure, a failure of this kind could mean that the system would fail to settle, which could mean that the funds transfers that were processed by the netting system on the date of the failure would not be completed. Depending on the number and value of the payments handled by the funds-transfer system, such a failure could have serious deleterious effects on the surviving participants and world financial markets generally.

CHIPS has taken a number of steps to control the risk of a settlement failure. In 1984, it required each of its participants to establish "bilateral credit limits" on each other participant as a measure of the credit risk that it would be willing to accept from the other participant. In 1986, CHIPS took a further step by establishing "sender net debit caps" on each participant as a percentage of the aggregate of the bilateral limits that had been established by other participants. This control limits the amount of risk that a participant can present to the system.

In 1990 CHIPS took the further step of requiring each of its participants to agree to pay a portion of a failed participant's settlement obligation. This "additional settlement obligation" is collateralized by Treasury securities pledged for this purpose and held at FRBNY. This collateralized loss-sharing arrangement assured that CHIPS would be able to settle even if the participant with the highest debit cap were to fail at its greatest possible debit position. (Called the "Lamfalussy Standard" because it was articulated by a working group of the Bank for International Settlements chaired by Alexandre Lamfalussy. CHIPS had in fact anticipated the Lamfalussy Standard and had adopted this risk-control measure before the BIS report had been issued.)

In 1994, CHIPS began to strengthen its existing risk controls so that by 1997 the two banks with the highest debit caps would fail simultaneously with each at its greatest possible debit position, and CHIPS would still be able to settle (referred to as a "Lamfalussy+1 Standard"). The same loss-sharing formula would allow CHIPS to settle if a large number of smaller banks were to fail.

Despite these measures, there remains the risk that a catastrophic financial crisis could result in a settlement failure on CHIPS with the result that all of the payment messages released would have to be "unwound"; i.e., all payment messages be pulled back from the receiving participant and returned to the sending participant, who would be free to decide whether or not the payment should be sent.

3. German EAF 2 System

A third type of system, which uses elements of both the gross settlement and net settlement systems, is the Electronic Clearing Frankfurt (EAF 2) system, operated in Frankfurt by the Deutsche Bundesbank, the central bank of Germany.

EAF 2's operating day has two phases. In phase 1 (8:00 a.m. to 12:45 p.m.), payment orders received from financial institutions are entered into the system and offset bilaterally. At regular intervals of approximately 20 minutes, final payments are available to the recipient credit institution in phase 1, as in a gross settlement system. The proceeds of the payment order can thereafter be made available to the beneficiary, without credit risk to the receiving bank. In a subsequent phase 2 (1:00 p.m. to 2:15 p.m.), an attempt is made to effect two-stage multilateral clearing of the remaining payments, which have not been netted bilaterally during the first phase. The crucial difference from multilateral clearing, as it exists at present, lies in the avoidance of the systemic risk. If there are uncovered debit balances, no unwinding, involving the exclusion of a participant and the return of all payments associated with the excluded participant, will take place; instead, only individual payments will be returned. These individual payments are treated as uncovered payments, as in a gross settlement system.

In phase 1, EAF 2 is very similar to a gross settlement system in which individual payments are executed after cover is available. It is based on the principle that, in bilateral relations, incoming payments are used preferably instead of account balances as cover for outgoing payments, by offsetting them against each other in 20-minute cycles, at which point they become final. The use of liquid funds as working balances, in the form of account balances, is necessary only to a limited extent, compared with a purely gross settlement system, in that the amounts of counterpayments included in the offsetting procedure do not match exactly. In EAF 2, in contrast to a net settlement system, incoming and outgoing payments, which are matched as far as possible, in terms of their amount, are offset against each other. The payments not included in the offsetting procedure are then carried over into queues for the next processing cycle. By contrast, in a net settlement system, a net balance is calculated as the difference between all incoming and outgoing payments, which is settled, in the case of CHIPS, for example, by debits or credits to an account at the end of day.

In EAF 2 the participants themselves determine how much liquidity or working balances in the form of so-called maximum sender amounts they wish to make available to clear residual differences between the payments included in the offsetting in the particular bilateral relation concerned. In this way, they limit the extent to which they are willing to resort to their own funds, in excess of those received from the counterparty. These maximum sender amounts are covered by the transfer of liquidity to a special account of a participant, whose credit balance has been assigned to the bilateral party concerned. Apart from that, the system takes advantage of the high level of two-way payments to conserve liquidity. At the end of phase 1, in order to simplify accounting, all bilateral debit balances of each participant are aggregated into a single overall credit balance, and both overall balances are booked on the giro accounts (a type of German draft account) and the assigned amounts released.

At the beginning of phase 2 (about 1.00 p.m.), there is an initial multilateral clearing process of the payments not offset in phase 1. If debit balances are not covered, the maximum volume of residual payments, which is covered by liquidity on the giro accounts, is calculated on the basis of an algorithm for sorting out individual payments. These residual payments then become final immediately. With the aid of the objective selection criteria predefined by the algorithm, individual payments that have caused the uncovered debit balances are identified. The individual payments that are regarded as uncovered are set aside provisionally pending the execution of the second multilateral clearing, and the revised balances are booked on the Bundesbank giro accounts.

Subsequently, the participants are granted a 45-minute period to acquire cover. Technically, this can be obtained in two different ways:

A payment input from the EIL-ZV (the gross settlement system by the Bundesbank) increases the account balance, which is then used to cover the net balances.

A payment input in the EAF 2 itself (in favor of participants with debit balances) changes the net balances between the participants; the liquidity on the giro accounts remain unchanged.

If net balances arising from the subsequent second multilateral clearing are still uncovered, no unwinding, involving the exclusion of a participant, is performed. Instead, by means of the above-mentioned algorithm, individual payments are now finally withdrawn until the covering funds on the giro accounts are sufficient. Thus the EAF 2 clearing and settlement is always completed, and the systemic risk typical of net settlement procedures is avoided by ruling out an unwinding of a high volume of payments. The individual payments that are treated as uncovered are deemed to be revoked and are not executed. The finality of the payments offset bilaterally in phase 1 and cleared and settled multilaterally in phase 2 is not affected by this. This procedure is also the same as that used in a gross settlement system, where uncovered payments remaining in queues are returned without affecting the finality of payments that have already been executed. Payments that have not been executed can be either entered on the same day into a gross settlement system, such as the German EIL-ZV system, whose operating hours may be extended slightly for this reason, or re-entered in EAF 2 the following day.

The EAF 2 system has several drawbacks. For one thing, although final settlement occurs throughout the day, the occurrences are at 20 minute intervals. Also, although the system allows prefunded accounts to be set up by individual institutions, each account is created for use in offsetting payments to a preselected financial institution. For example, Bank A may set up an account for offsetting payments and receipts vis-à-vis Bank B, and only Bank B, and another account for Bank A's relations with Bank C, and so on.

Therefore, given this background, the need exists for a system that allows for continuous intraday final settlement of payments by means of prefunded accounts of participating financial institutions that are used to offset payments and receipts as against all other participants.

SUMMARY OF THE INVENTION

In view of the above deficiencies of the prior art, an object of the present invention is to provide a system and method for continuous intraday final settlement of payment orders between banks in which the system receives payment orders from and transmits payment orders to financial institutions so that the payments are finally settled when transmitted. The system requires minimum auxiliary funding and has delays that vary with payment size but that are acceptably small, and a high percentage of the total dollar volume is released before cutoff.

In furtherance of this and other objects of the present invention, there is provided a system for continuous intraday final settlement of payment orders among a plurality of financial institutions ("participants"), each having an associated satellite computer station operable to transmit payment orders electronically and each being operable to function as a payment receiving participant and a payment sending participant. The system comprises: (a) a central controlling agent, including a central computer operable to communicate electronically with the satellite computer stations of the participants to receive payment orders therefrom, and to control release of payment orders to the participants; and (b) means for storing a plurality of prefunded balances in a prefunded balance account, each balance representing the right of one of the participants to payment from the prefunded balance account and containing an initial prefunded balance for each participant at a start of each business day. The central computer is operable on a continuous basis: (1) upon receipt of a payment order by said central controlling agent from one of said participants, operating as a sending participant, for payment to another of said participants, operating as a receiving participant, to categorize each received payment order as small if it is less than a predetermined percentage of one of the initial prefunded balance for the associated sending participant and the initial prefunded balance for the associated receiving participant, and as large otherwise; (2) to store the received payment order in a queue maintained by said central computer; (3) to monitor the queue for previously stored small payment orders as candidates for immediate release for payment; (4) to determine if release of a candidate small payment order for payment will cause available balances for both the sending participant and the receiving participant associated with the candidate small payment order to fall within respective predetermined limits; (5) if the determination in step (4) is positive, to release the candidate small payment order by debiting the available balance of the sending participant and crediting the available balance of the receiving participant by the amount of the associated candidate small payment order; (6) to monitor the queue for previously stored target large payment orders for payment from a sending participant to a receiving participant; (7) to release a target large payment order stored in the queue by performing multilateral batching (i) by forming a first tree comprised of the target payment order and, if necessary, helper payment orders in a direction towards the sending participant of the target payment order, from at least one sending participant other than the sending participant of the target large payment order; (ii) by forming a second tree comprised of the target payment order and, if necessary, helper payment orders in a direction away from the receiving participant of the large target payment order, to at least one receiving participant other than the receiving participant of the target payment order; (iii) debiting the available balances of the sending participant of the target large payment order and of the sending participants of the helper payment orders in a multilateral batch comprising the target and helper payment orders of the first and second trees by the amounts of each respective payment order; and (iv) crediting the balances of the receiving participant of the target large payment and of the receiving participants of the helper payment orders in the multilateral batch by the amounts of the respective payment orders; the multilateral batch having been chosen so that after the payment orders comprising the first and second trees are released, the resulting position in the available balance of each participant involved in the multilateral batching falls within predetermined limits.

Preferably, the computer system is operable to selectively offset, in a bilateral batch, the amount of a target large payment order by searching the queue for a previously queued second payment order from the associated receiving participant of the target large payment order; to generate a pseudo-payment order in an amount of a net difference between the target large payment order and the second payment order; and to store the pseudo-payment order in the queue.

Also in furtherance of the above and other objects, there is provided a method for continuous intra-day final settlement of payments among a plurality of participants, each having an associated satellite computer station operable to transmit payment orders electronically and each being operable to function as a payment receiving participant and a payment sending participant by a central controlling agent including a central computer operable to communicate electronically with the satellite computer stations of the plurality of participants to receive payment orders therefrom, and to control release of payments to the plurality of participants; and means for storing a plurality of prefunded balances in a prefunded balance account, each balance representing the right of one of the participants to payment from the account in which the prefunded balances are held and containing an initial prefunded balance for each participant at a start of each business day. The method comprises the steps of: (1) upon receipt of a payment order by the central controlling agent from one of the participants, operating as a sending participant, for payment to another of the financial institutions, operating as a receiving participant, categorizing each received payment order as small if it is less than a predetermined percentage of one of the initial prefunded balance for the associated sending participant and the initial prefunded balance for the associated receiving participant, and as large otherwise; (2) storing the received payment order in a queue maintained by the central computer; (3)

monitoring the queue for previously stored small payment orders as candidates for immediate release for payment; (4) determining if release of a candidate small payment order for payment will cause available balances for both the sending participant and the receiving participant associated with the candidate small payment order to fall within respective predetermined limits; (5) if the determination in step (4) is positive, releasing the candidate small payment order by debiting the available balance of the sending participant crediting the available balance of the receiving participant by the amount of the associated candidate small payment order; (6) monitoring the queue for previously stored target large payment orders for payment from a sending participant to a receiving participant; (7) releasing a target large payment order stored in the queue by performing multilateral batching (i) by forming a first tree comprised of the target payment order and, if necessary, helper payment orders in a direction towards the sending participant of the target payment order, from at least one sending participant other than the receiving participant of the target large payment order; (ii) by forming a second tree comprised of the target payment order and, if necessary, helper payment orders in a direction away from the receiving participant of the large target payment order, to at least one receiving participant other than the receiving participant of the target payment order; (iii) debiting the available balances of the sending participant of the target large payment order and of the sending participants of the helper payment orders in a multilateral batch comprising the target and helper payment orders of the first and second trees by the amounts of each respective payment order; and (iv) crediting the balances of the receiving participant of the target large payment and of the receiving participants of the helper payment orders in the multilateral batch by the amounts of the respective payment orders; the multilateral batch having been chosen so that after the payment orders comprising the first and second trees are released, the resulting position in the available balance of each participant involved in the multilateral batching falls within predetermined limits.

Preferably, the method further comprises a step of selectively offsetting, in a bilateral batch, the amount of a target large payment order by searching the queue for a previously queued second payment order from the associated receiving participant of the target large payment order; generating a pseudo-payment order in an amount of a net difference between the target large payment order and the second payment order; and storing the pseudo-payment order in the queue.

In furtherance of this and other objects of the present invention, there further is provided a computer-readable medium storing code executable by a central computer, the code controlling the central computer to perform a method for continuous intraday final settlement of payments among a plurality of participants, each having an associated satellite computer station operable to transmit payment orders electronically and each being operable to function as a payment receiving participant and a payment sending participant. The central computer forms a part of a central controlling agent and is operable to communicate electronically with the satellite computer stations of the plurality of participants to receive payment orders therefrom, to control release of payments to the plurality of participants, and to control means for storing a plurality of prefunded balances in a prefunded balance account, each balance representing the right of one of the participants to payment from the account in which the prefunded balances are held and containing an initial prefunded balance for each participant at a start of each business day. The method comprises the steps of: (1) upon receipt of a payment order by the central controlling agent from one of the participants, operating as a sending participant, for payment to another of the participants, operating as a receiving participant, categorizing each received payment order as small if it is less than a predetermined percentage of one of the initial prefunded balance for the associated sender financial institution and the initial prefunded balance for the associated receiver financial institution, and as large otherwise; (2) storing the received payment order in a queue maintained by the central computer; (3) monitoring the queue for previously stored small payment orders as candidates for immediate release for payment; (4) determining if release of a candidate small payment order for payment will cause available balances of both the sending participant and the receiving participant associated with the candidate small payment order to fall within respective predetermined limits; (5) if the determination in step (4) is positive, releasing the candidate small payment order by debiting the available balance of the sending participant and crediting the available balance of the receiving participant by the amount of the associated candidate small payment order; (6) monitoring the queue for previously stored target large payment orders for payment from a sending participant to a receiving participant; (7) releasing a target large payment order stored in the queue by performing multilateral batching (i) by forming a first tree comprised of the target payment order and, if necessary, helper payment orders in a direction towards the sending participant of the target payment order, from at least one sending participant other than the sending participant of the target large payment order; (ii) by forming a second tree comprised of the target payment order and, if necessary, helper payment orders in a direction away from the receiving participant of the target large payment order, to at least one receiving participant other than the receiving participant of the target payment order; (iii) debiting the available balances of the sending participant of the target large payment order and of the sending participants of the helper payment orders in a multilateral batch comprising the target and helper payment orders of the first and second trees by the amounts of each respective payment order; and (iv) crediting the available balances of the receiving participant of the target large payment and of the receiving participants of the helper payment orders in the multilateral batch by the amounts of the respective payment orders; the multilateral batch having been chosen so that after the payment orders comprising the first and second trees are released, the resulting position in the available balance of each participant involved in the multilateral batching falls within predetermined limits.

Preferably, the computer readable medium stores code to cause the apparatus to perform the method further comprising a step of selectively offsetting, in a bilateral batch, the amount of a target large payment order by searching the queue for a previously queued second payment order from the associated receiving participant of the target large payment order; generating a pseudo-payment order in an amount of a net difference between the target large payment order and the second payment order; and storing the pseudo-payment order in the queue.

BRIEF DESCRIPTION OF THE DRAWINGS

FIG. 1A is a block diagram of a computer system for implementing the present invention;

DETAILED DESCRIPTION OF THE PREFERRED EMBODIMENTS

I. SYSTEM OVERVIEW

Figure 1:
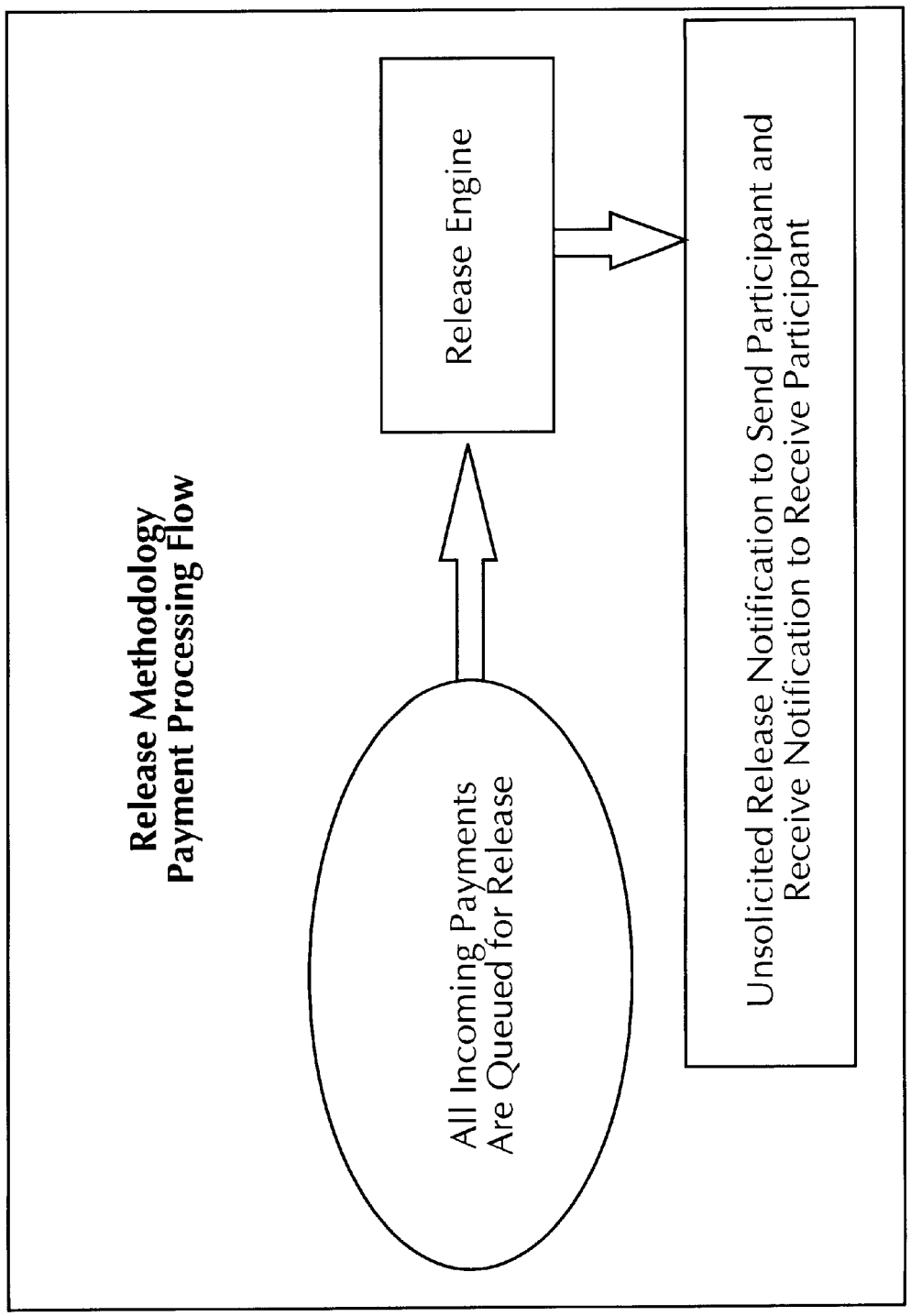
FIG. 1 illustrates the release methodology payment process flow of the present invention.

The present invention relates to a system including a central controlling agent having a central computer that is structured to communicate with participating financial institutions. The system has hardware to control and update prefunded balance accounts associated with the participating financial institutions, and, by means of crediting and debiting these accounts within predetermined constraints, the system controls release and settlement of payments between and among the participating institutions. The system preferably is implemented with a computer system having the ability to communicate electronically with banks, including the participating financial institutions as well as the Federal Reserve Bank that is providing the settlement service, and having storage capacity sufficient to maintain queues for temporarily storing payment orders received by banks until the associated payments can be released. The system may be implemented using certain aspects of the current CHIPS system hardware. However, when implemented using CHIPS hardware, the system achieves a significant improvement over the current CHIPS implementation by providing intraday finality of all releases. The system of the present invention is not limited to this implementation, however, and may be implemented using hardware and software independent of and different from that utilized in the CHIPS system.

A detailed description of the current CHIPS system can be found in the CHIPS Systems and Operations Manual, published by The Clearing House Service Company L.L.C., which is incorporated herein by reference.

A design goal of the system of the present invention is to achieve intraday payment finality while using prefunded balances that are smaller than the value of the collateral currently pledged to secure certain obligations as required by, the prior art CHIPS system.

The system of the present invention includes a computer controlled apparatus that employs software that continuously matches, nets, and releases payment messages on an individual, bilateral, or multilateral basis among participating financial institutions ("participants") throughout the day. Under the system, no payment message will be released to a receiving participant unless (a) the value of the payment message can be simultaneously charged against and credited to prefunded balances established by the sending and receiving participants or (b) the payment message has been netted and set off against one or more other payment messages and the resulting balance can be simultaneously charged against and credited to the prefunded balances. This procedure will result in "final settlement" of the sending participant's obligation to pay the amount of the payment message to the receiving participant under section 4-A-403(1)(a) or section 4-A-403(2) of the New York Uniform Commercial Code.

The system removes any risk of settlement failure should one or more participants fail, even if the failure were to occur during the business day. This significant improvement over the current CHIPS system is the result of requiring each participant to deposit a predetermined amount into an account (prefunded balance account), at a Federal Reserve Bank and prohibiting the release of any payment message unless its value, or the balance including netting and set-off, does not exceed the participant's available balance in the account.

The system is expected to permit the release of more than 99 percent of the number of payment messages, with a value of more than 96 percent of the total value of payment messages, during the course of the business day. If utilized in CHIPS, the system of the present invention will eliminate the last elements of settlement risk that remains in the CHIPS system.

In addition, use of the system of the present invention will significantly reduce overall risk in the payment system when compared with prior art systems. The new system will reduce settlement risk by permitting dollar payments that are part of foreign exchange transactions to be final as soon as the payment is released. For example, the dollar side of a dollar-Euro transaction can be settled with a final payment early in the day and at the same time that the Euro payment is settled in Frankfurt, Germany, the location of the EAF-2 System.

In lieu of pledging U.S. Treasury securities to secure its obligations, as, e.g., under the CHIPS Rules, in a preferred embodiment of the system of the present invention, each participant will be required to deposit a predetermined amount (its "initial prefunded balance") by sending a final, irrevocable payment to an account ("prefunded balance account") on the books of the Federal Reserve Bank of New York ("FRBNY"). The system records each participant's initial deposit to the prefunded balance account, e.g., if implemented in CHIPS, on books and records of CHIPS, and also records all intraday debits or credits that accrue to a participant when payment messages are released. The intraday record of each participant's prefunded balance, as adjusted to reflect all debits and credits, is referred to as the participant's "available balance" and establishes the portion of the prefunded balance account that belongs to each participant at any point in time during the day.

No participant will be permitted to send or receive payment messages unless it has deposited its initial prefunded balance to the prefunded balance account. Deposits to the prefunded balance account may begin as soon as Fedwire opens at 12:30 A.M.. All participants will be required to have deposited their initial prefunded balances no later than 9:00 A.M. (7:00 A.M. on the day after a holiday observed by Federal Reserve Banks). It is anticipated that most participants will make the required deposits to the prefunded balance account by sending Fedwire payment orders to the account from their reserve or clearing accounts, but participants that do not have accounts with a Federal Reserve Bank may have correspondents send Fedwire payment orders on their behalf.

Each participant's required initial prefunded balance will be determined using a formula designed to ensure optimal performance of the system. The initial prefunded balance will be recalculated at the end of each week to determine initial prefunded balance requirements for the next week. It is expected that a participant's initial prefunded balance requirement will be approximately the same as that participant's collateral requirement under the current CHIPS.

Participants will not be permitted to make additional deposits to or withdrawals from the prefunded balance account during the day until the system has closed for receipt of payment messages. As a result the balance in the prefunded balance account will not be decreased on the books of the Federal Reserve Bank during this period. However, the available prefunded balance of each participant will change during the day based on the release and receipt of payment messages. As payment messages are simultaneously netted, set-off, and released pursuant to the procedures described below, the system will make the appropriate debits and credits to the available balances of the sending and receiving participants. Thus, each participant's available balance will be adjusted and readjusted during the day as payment messages are released and received. In the preferred embodiment, no participant's available balance will be permitted to be less than zero (its "minimum available balance") or more than twice the required initial prefunded balance (its "maximum available balance"), however the invention could be implemented using different constraints and is not limited to the preferred embodiment.

The present invention relates to a computer-based system including a computer program to control the release of payment messages. This program (the "balanced release engine") will continuously match, net, set off, and release payment messages throughout the day. All incoming payment messages will be received by the system and held in a queue or, preferably several queues for release when the requirements of the computer program are satisfied. The program will broadly classify each payment message as large (in the current modelling equal to or greater than 80 percent of one of, and preferably the lesser of, the sending participant's initial prefunded balance and the receiving participant's initial prefunded balance) or small (less than 80 percent of the one, preferably lesser, initial prefunded balance).

Throughout the specification the term "large" will be used to refer to the category of payment orders equal to or greater than 80% of the initial prefunded balance. However, the inventors have found some improvement in the efficiency of the system can be attained if the payment orders less than 80%, referred to broadly as "small" in the description, be further divided into "medium" payment orders, i.e., those payment orders of an amount falling between 20% and 80% of the initial prefunded balance, and "small", or "very small" payment orders, i.e., those of an amount less than or equal to 20%. In the following description, when the convention of describing payment orders as being small, medium or large is used, it is the above three percentage categories that are being referred to. At portions of the following description that do not refer to medium payment orders, the more broad term "small" is intended to refer to all payment orders less than 80% of the lesser initial prefunded balance. It should be noted that the percentages chosen for the preferred embodiment are somewhat arbitrary. The important feature is that a classification is made by the size of the payment order in relation to an initial prefunded balance or balances.

The program will release payments individually, in bilateral batches, or in multilateral batches and release notification will be sent to the sending participant while a receive notification will be sent to the receiving participant. This general payment processing flow is shown in FIG. 1.

The release of a large payment individually would ordinarily cause the sending participant to fall below its minimum available balance or cause the receiving participant to exceed its maximum available balance. Therefore, the balanced release engine will not release the payment and will begin to search for payments that can be included in a batch and netted against the large payment message. If needed, other "helper" payment messages from other participants will be added to the batch in such a manner that all the payment messages in the batch may be netted and set-off against one another so that the net changes to the available balance of each participant with payment messages in the batch will not cause any participant's available balance to drop below zero or exceed its maximum. This batching will be discussed in greater detail below.

While the inventors believe that the system of the present invention will allow release of more than 99 percent of payment messages sent by sending participants (96 percent of the value of all payment messages), simulations indicate that, when implementing the system using CHIPS hardware, a small number of payments will remain unreleased when CHIPS has closed for the receipt of further payment messages. The following procedure will be used to release and settle these payment messages before the close of business.

After the closing time for the receipt of payment messages, the balanced release engine will be used to match, net, set off, and release as many of the remaining payment messages as possible without regard to any participant's maximum available balance. Following this procedure, the balanced release engine will be used to calculate a net balance for each participant based on the remaining unreleased payment messages without actually netting, setting off, or releasing these payment messages.

If the resulting number for a participant is negative, then that participant has a "final prefunded balance requirement"; if the resulting number for a participant is positive, then the participant has a "final prefunded balance entitlement." Each participant will then receive an administrative message advising of its final prefunded balance requirement or its final prefunded balance entitlement.

Each participant with a final prefunded balance requirement will be given 30 minutes to send a Fedwire funds transfer in the amount of its final prefunded balance requirement to the prefunded balance account. Once all of these funds transfers have been completed, all remaining unreleased payment messages will be netted, set off, and released, and, at the same time, the system will send to each participant with a final prefunded balance entitlement a Fedwire funds transfer in the amount of its final prefunded balance entitlement.

If any participant with a final prefunded balance requirement is unwilling or unable to send the required Fedwire funds transfer to the prefunded balance account, the balanced release engine would be run again using the available balances as adjusted by the addition of the final prefunded balance requirements that were received during the final funding phase. This would allow for the release of additional payment messages. Sending participants will be notified concerning any payment messages that remain unreleased following this procedure. Sending participants will be able to redirect any unreleased payment message through Fedwire before that system closes.

II. LEGAL BASIS OF FINALITY

Each current CHIPS payment message is a payment order within the meaning of section 4-A-103 of the New York Uniform Commercial Code. Currently, under CHIPS Rule 2, "[t]he release of a payment message creates an obligation of the Sending Participant to pay the Receiving Participant the amount of the payment message." See CHIPS Rules and Administrative Procedures, published by The Clearing House Service Company L.L.C. No such obligation exists for a CHIPS payment message before it is released. CHIPS Rule 2 also provides that the "obligation of the Sending Participant to pay the Receiving Participant is to be netted in accordance with Rule 12 and settled in accordance with Rule 13."

Rule 12 states that CHIPS payment messages are continuously netted and set-off against each other, and Rule 13(c)(1) provides that the multilateral net balances remaining from this netting and set-off procedure are settled through the settlement account at The Federal Reserve Bank of New York ("FRBNY"). Under Rule 13(c)(2), settlement is complete when the required payments to and from the settlement account have been made.

The effect of the interplay between the cited provisions of the CHIPS Rules and the New York Uniform Commercial Code is that the payment of the sending participant's obligation to the receiving participant is not final until after settlement has been completed at the end of the day.

A chief benefit of the system of the present invention is that it allows the sending participant's obligation to the receiving participant to be paid at the same time as the payment message is released to the receiving participant. This also is authorized under provisions of the Uniform Commercial Code. Section 4-A-403(2) of the New York Uniform Commercial Code provides that as between members of a funds-transfer system that nets obligations multilaterally among participants (as the current CHIPS does), "the receiving bank receives final settlement when settlement is complete in accordance with the rules of the system." Section 4-A-403(2) provides that > The obligation of the sender to pay the amount of a payment order transmitted through the funds-transfer system may be satisfied, to the extent permitted by the rules of the system, by setting off and applying against the sender's obligation the right of the sender to receive payment from the receiving bank of the amount of any other payment order transmitted to the sender by the receiving bank through the funds-transfer system. The aggregate balance of obligations owed by each sender to each receiving bank in the funds-transfer system may be satisfied, to the extent permitted by the rules of the system, by setting off and applying against that balance the aggregate balance of obligations owed to the sender by other members of the system.

Moreover, under N.Y. U.C.C. § 4-A-403(1)(a), payment of a sender's obligation "occurs when the receiving bank receives final settlement of the obligation . . . through a funds-transfer system."

As was mentioned above, under the system of the present invention, payment messages will be released either individually or in batches. If a payment message is released individually, it will be simultaneously settled and the sending participant's obligation paid by a debit and credit to the available balances of the sending and receiving participants. This, in effect, is a "gross settlement" through a funds-transfer system that is immediately final and authorized by N.Y. U.C.C. § 4-A-403(1)(a). If payment messages are released in a batch, each payment message is settled by netting the sending and receiving participants' obligations to one another, and, if more than two participants have payment messages in the batch, by also netting the bilateral net balances of all participants in the same batch. Each participant's balance that results from the netting (whether it is a bilateral net balance or a multilateral net balance) is simultaneously settled through a debit or credit to its available balance. When this is done, settlement of those payment messages will be complete in accordance with the proposed rules to govern the system of the present invention. This netting and adjustment of available balances will constitute final settlement and payment under sections 4-A-403 (2) and 4-A 03 (1)(a).

The procedure will provide that payment obligations in respect of payment messages will be settled through the netting and the adjustment of available balances at the time the payment message is released to the receiving participant. In addition, there will be no need to provide for an "unwind" as in the current CHIPS system (i.e., the authority of the board of directors under CHIPS Rules 2 and 13(k) to declare that CHIPS has failed to settle and to return all payment messages to storage). Similarly, there will be no need for the collateralized loss-sharing arrangements provided for under CHIPS Rule 13.

III. BALANCED RELEASE ENGINE

As was discussed above, the balanced release engine determines when payments between banks can be released to the intended receiver. In the present invention, release of payments proceeds differently for payments in different dollar size classes, as will now be discussed.

Each participant in the system must deposit a predetermined amount, or initial prefunded balance, into a prefunded balance account. A credit limit (maximum available balance) of twice the initial prefunded balance is set as an upper limit or "cap", while the available balance is never permitted to go below zero (debit limit or "cap"), to be referred to as the minimum available balance in the system of the present invention. A "flow cap" arbitrarily defined as 0.8 times the initial prefunded balance, is used broadly to distinguish "small" from "large" payments; those smaller than the flow cap are defined as small, others are defined as large.

A. Release of Small Payments

The balanced release engine releases small payments, i.e. preferably those less than 80% of the lower of the initial prefunded balances of the sending participant and receiving participant, individually (without batching) from bilateral FIFO queues, resident in the central computer storage, upon which incoming payment orders are placed upon receipt, as the positions of the sending and receiving participants permit. Neither the minimum nor maximum available balances discussed above may be exceeded following the release of a payment. Priority is always given to the release of the earliest queued payments. However, since "earliest" has different meanings for sender and receiver, a matching technique, based upon the Gale-Shapley algorithm, to be discussed in detail below, is used to find an optimum match of senders with receivers that is in some sense the best possible one for both senders and receivers.

B. Release of Large Payments

The balanced release engine releases payments with the aid of multilateral and/or bilateral batching. Bilateral batching will now be described.

1. Bilateral Batching

Large queued payments are batched bilaterally as follows. When a large payment order from bank A to bank B is queued, a check is made to see whether there is another payment order from bank B to bank A already queued that is between half as large and twice as large as the first payment order. If so, such a second payment order is chosen and is batched with the first one. The result is a "pseudo-payment" whose amount is the difference of the amounts of the original two payment orders. Notice that this difference will be less than or equal to each of the amounts of the two payment orders in the batch. The direction of the pseudo-payment is the direction of the larger payment order.

After a pseudo-payment is formed, the process is repeated iteratively until no suitable "second" payment order is available. At each step, the size of the pseudo-payment gets smaller or, at worst, remains the same. Thus, the overall effect of bilateral batching is to reduce the size and number of the payments to be released. These pseudo-payments are then released either as small payments as described above, or as large payments, using multilateral batching, described next. When the system "releases" a pseudo-payment, it releases all of the batched payments linked into the pseudo-payment in one transaction.

2. Multilateral Batching

Multilateral Batching is utilized in the system of the present invention to provide a means to release payments (and pseudo-payments) larger than the flow cap; even payments much larger than the debit and credit caps.

When a large payment is queued, after any bilateral batching has been done, a check is begun to see whether any large payments on the queue can now be released.

When considering the release of a given large payment P from bank A to bank B, usually such a release would lower the position of bank A below its debit cap, and might also raise the position of bank B beyond its credit cap. Therefore helper payments are used to bank A from third party participants currently in a credit position to produce a net position at bank A that is within the prescribed limits. Helper payments are chosen initially with only the position at bank A in mind.

Figure 2:
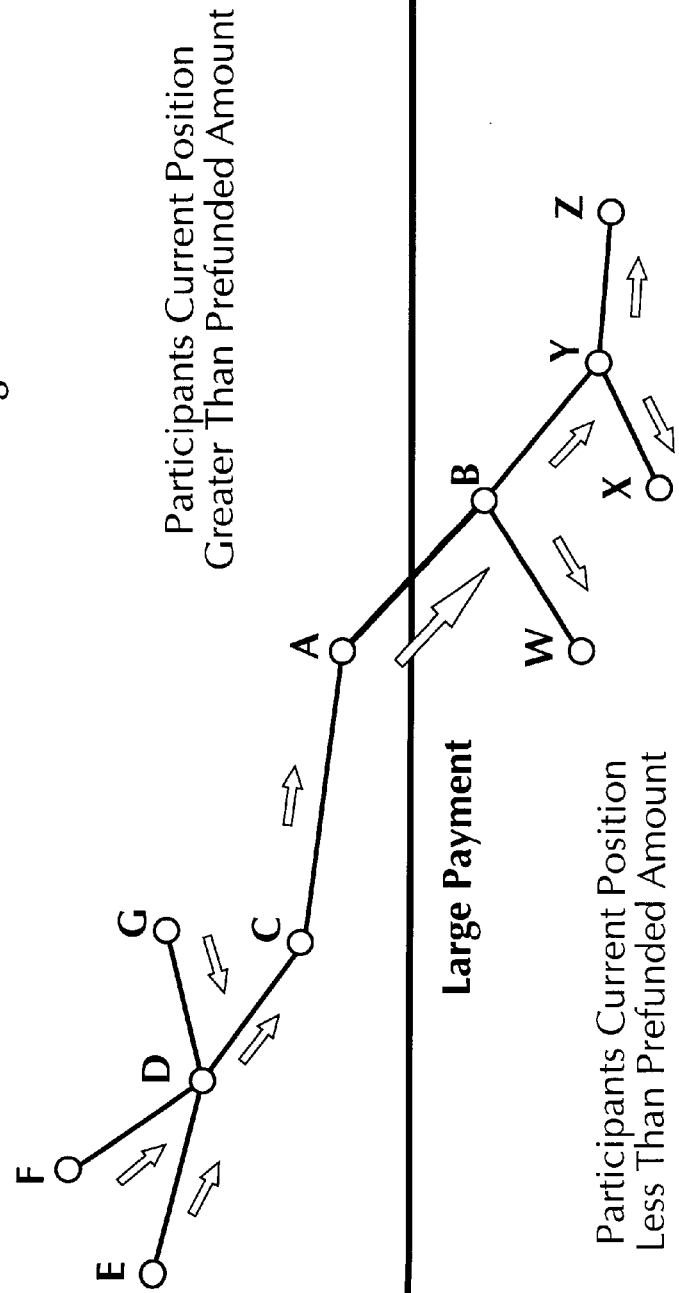
FIG. 2 illustrates the tree payment structure of multilateral batching in the present invention.

At each stage of the construction of the multilateral batch, a tree of payments exists directed downward toward the root participant bank A. An example of such a tree is shown in FIG. 2, which will be discussed in greater detail below. Participants at nodes of the tree, such as bank B in FIG. 2, with both incoming and outgoing branches satisfy their limit constraints. Leaf (terminal) nodes of the tree are participants that may exceed their debit cap, and which therefore may themselves need helper payments. Any participant in the tree that needs help of this sort is later either supplied with the help or is discarded, cutting back the tree.

If the construction succeeds, a tree of payments is obtained among the participants previously in a credit position such that every participant position in the tree, including participant bank A, is within its prescribed debit and credit limits.

If the above tree can be created, an attempt is made to accomplish the analogous situation at bank B using payments to participants previously in a debit position. Another tree is constructed, if possible, so that every participant position in the second tree is within the limits. If all this is accomplished successfully, all of the payments taken together constitute a multilateral batch and are released in a single transaction.

IV. SYSTEM HARDWARE

An example of a computer system for executing the program that drives the system of the present invention is shown in FIG. 1A. The system includes a CPU 31 that performs processing functions. Also included is read only memory 32 (ROM), which stores at least some of the program instructions to be executed by CPU 31, such as portions of the operating system or basic input-output system (BIOS), and random access memory 33 (RAM) used for temporary storage of data. The computer also includes a network interface 72 which enables communication with external devices, such as the computers located at participant financial institutions. A data storage device 34 is provided to allow for storage of data. Data storage device 34 may be written to or read from the CPU 31. Data/Address bus 37 connects the ROM 32, RAM 33 and data storage device 34 to the CPU. A keyboard is preferably provided to receive input from an operator. However any conventional method of operator input may be used. A display is preferably provided for conveying information to the operator of the computer.

V. DETAILED DESCRIPTION OF BALANCED RELEASE ENGINE

The program that runs on the computer system of the present invention utilizes certain basic criteria:

1. The funds posted by each participant in the prefunded balance account is used to pay its own payment orders.

2. A participant's available balance will not be allowed to be negative, that is, fall below zero dollars ("minimum available balance").

3. A maximum available balance, equal in the preferred embodiment to twice the magnitude of the initial prefunded balance requirement, is imposed on each participant. A participant's available balance, including the amount of his initial prefunded balance, will not be allowed to exceed his credit limit. Although this upper limit is not needed for limiting of risk, simulations run by the inventors have shown that such a limit is needed to provide satisfactory functioning of the system. As discussed above, this limit is eliminated for processing after the end of the day cutoff.

4. At the culmination of the process described in item 5 below, the program decides to "release" a payment message. At this point, the system issues an instruction to change the available balances of the sending participant and the receiving participant to reflect the instructions of the order.

5. Instead of always releasing payment orders as they are received, the decision as to when payment orders should be released is made as follows in accordance with one embodiment of the present invention:

First, an incoming payment order is classified as being "small" (i.e. less than a "flow cap", preferably of 80% of the lesser of the sending participant's and the receiving participant's initial prefunded balance requirements) or "large" (i.e. not "small"). Small payment orders, which comprise most of the workflow, can be queued for immediate release, provided that release would not violate items 2 or 3 above. Entries in the queue are processed according to a version of the "first in, first out" queue discipline (FIFO). However, the earliest payment order in the sending participant's queue may or may not be earlier than earliest payment order in the receiving participant's queue. Hence, a matching technique is used to select which payment orders should be processed first. Details of this technique are effectively policy decisions about which payment orders are to be released, and in what order. The details of the algorithm are discussed below.

"Large" payment orders are released as part of a "batch" of netted payment orders. For most of the day's processing, these large payment orders are initially placed into the "delay" queue, where they are eligible to be "helper orders" for multilateral or, optionally, for bilateral batching as discussed above. Immediately after passing through the delay queue, a large payment order remains eligible for inclusion as a helper payment order in the multilateral batching procedure. In addition, an attempt is made to include the payment order as part of a bilateral batch.

Payment orders that are larger than the flow cap but smaller than the sending participant's initial prefunded balance could be released by themselves at this point, provided that the sending participant's available balance is sufficiently far away from zero and provided that the receiving participant's maximum available balance would not be violated. However, payment orders of less than 160% of the sending participant's initial prefunded balance requirement do not trigger an invocation of bilateral batching.

If the attempt at bilateral batching fails, the payment order remains in the queues, available as a helper order to both the bilateral batching and the multilateral batching procedures. The multilateral batching procedure also scans the list of queued large payment orders, sorted by time stamp (an indication of the time at which the payment order was received by the system), making each a "target payment order" of the multilateral batching procedure. Details of bilateral and multilateral batching follow:

A. Bilateral Batching.

If a large payment order from participant 1 to participant 2 is queued, for it to be bilaterally batched, it is netted with the earliest queued payment order from participant 2 to participant 1 that is between half as large and twice as large as the large payment order just queued. This restriction on the size of nettable payment orders from participant 2 to participant 1, as was discussed above, guarantees that the resulting, netted pseudo-payment order is less than or equal to both original payment orders. This process is repeated iteratively until no nettable payment orders larger than a "small payment cap" of 20% of participant 1's initial prefunded balance requirement are found in either the queue from participant 2 to participant 1 or the queue from participant 1 to participant 2. The inventors have found that this arbitrary choice provides good performance with efficient operation. It should be noted that bilateral batching is not necessary for operation of the present invention and that the system can function efficiently using only the combination of the multilateral batching and individual release techniques described throughout the specification.

The following example is useful in understanding this process: Suppose the initial prefunded balance requirement for A and B are both $10 million and that there is initially nothing in either queue. If A then wants to make a payment to B of $100 million, it would have to be stored on the queue of payment orders from A to B because it exceeds both A's initial prefunded balance requirement and B's maximum available balance. Similarly, a payment order of $800 Million from B to A should be stored on the queue of orders from B to A, without being netted with the order from A to B. A subsequent payment order of $600 million from A to B would then be netted with the payment order from B to A, producing a pseudo-order of $200 million from B to A that would be queued as a single order. This pseudo-payment order could then be netted with the previously queued payment order from A to B of $100 million. If, on the other hand, the $800 million and $600 million payment orders entered the system first, they would immediately be netted into a single $200 million pseudo payment order that would be placed on the queue from B to A.

The resulting pseudo-payment order is then treated identically to an actual payment order. In other words, if the netting process results in a pseudo-payment order from participant 1 to participant 2, it is queued in participant 1's payment queue to participant 2; if the netting process results in a pseudo-payment order from participant 2 to participant 1, it is queued in participant 2's payment queue to participant 1. And, as with an actual payment order, the pseudo-payment order is released if and when it would not exceed either the sending participant's maximum available balance or the receiving participant's maximum available balance.

B. Multilateral Batching.

This procedure attempts to identify a double tree of nettable large payment orders (as defined above) and process them as a batch. The procedure starts with a particular large payment order that has been identified as a "target payment order." The goal is to identify a list of "helper orders" that can be netted with the target payment order so that the net order satisfies all maximum and minimum available balance constraints.

For example, suppose that the target payment order is a large payment order of an amount $A_{12}$ from participant 1 to participant 2. By assumption, if the payment order were released, 1's available balance position, $P_1$, including the initial prefunded balance requirement, $F_1$, would be negative, or, in symbols, $$P_1 - A_{12} < 0. \tag{1}$$

However, it may be the case that there is another payment order of amount $A_{31}$ from participant 3 to participant 1 such that $$2F_1 \geq A_{31} + P_1 - A_{12} \geq 0; \tag{2}$$

in other words, there is an order to send a "helper payment" to 1 that would increase its available balance sufficiently that 1's available balance would no longer go below zero. The first phase of the multilateral batching program is to search the queue of payment orders to 1 for such helper orders, but only among participants that have an available balance of greater than zero. (See below for an explanation of this restriction.) If more than one possibility is found, the payment order that would itself require the smallest amount of help will be used. If no single payment order can be found that satisfies these constraints, the largest payment order that could partially offset the potential balance deficit would be used, augmented with other, smaller payment orders.

If, as is usually the case, $P_3 - A_{31} < 0$ for the helper order(s) chosen, an attempt is made to find a helper order for that payment order, i.e. a payment order from yet another participant, 4, such that $$2F_3 \geq A_{43} + P_3 - A_{31} \geq 0, \tag{3}$$

and so forth.

Ideally, a multilateral batch of payment orders is eventually generated such that each participant's available balance remains within the maximum and minimum available balance limitations. Otherwise, a suitable tree cannot be completed (i.e. the program terminates "empty handed"). If those participants with available balances greater than zero (i.e. P>0) are allowed to make helper payment orders, the helper orders required at each stage tend to get smaller and smaller, facilitating successful batching. This is evident from (2) and (3), in which the available balances of 1 and 3, respectively, help reduce the required sizes of $A_3$, and $A_{43}$, respectively.

If $P_2 + A_{12} > 2F_2$, i.e. the sum of bank 2's available balance and the original payment order from 1 to 2 would exceed 2's maximum available balance, a similar tree is built for participants to whom 2 has queued payment orders, possibly branching out to participants to whom they have queued payment orders, etc.

As noted above, an example of multilateral batching is illustrated in FIG. 2, which shows trees of helper payments that assist a target payment. In the figure, a target payment from Bank A to Bank B that does not meet the criteria for immediate release or bilateral release is chosen as the target for multilateral batching based, in part, upon how long it has been in the queue. All participants shown above the thick horizontal line currently have available balances greater than their initial prefunded balance requirements. Those shown below the line have available balances below their initial prefunded balance requirements.

An attempt is made to group helper payments above the line to construct a tree of payments among the banks with available balances greater than zero to aid the sending participant (A) in sending a designated large payment order without its available balance dropping below zero. A second tree of payments is constructed among banks in a debit position (i.e., below the line) to aid the receiving bank in accepting the designated large payment without exceeding its maximum available balance.

In constructing the tree, a fairly large helper payment is shown from C to A which ensures that A's position will not exceed its debit cap as a result of the transfer of funds to B. To ensure that C's available balance does not fall below zero, a payment from D is supplied to C. D is in turn supplied with helper payments from banks E, F and G.

Below the line, in order to bleed away excess funds, which would cause B to exceed its maximum available balance, payments from B to Y and W are grouped, with Y providing further helper payments to avoid exceeding its own maximum available balance.

Figure 3:
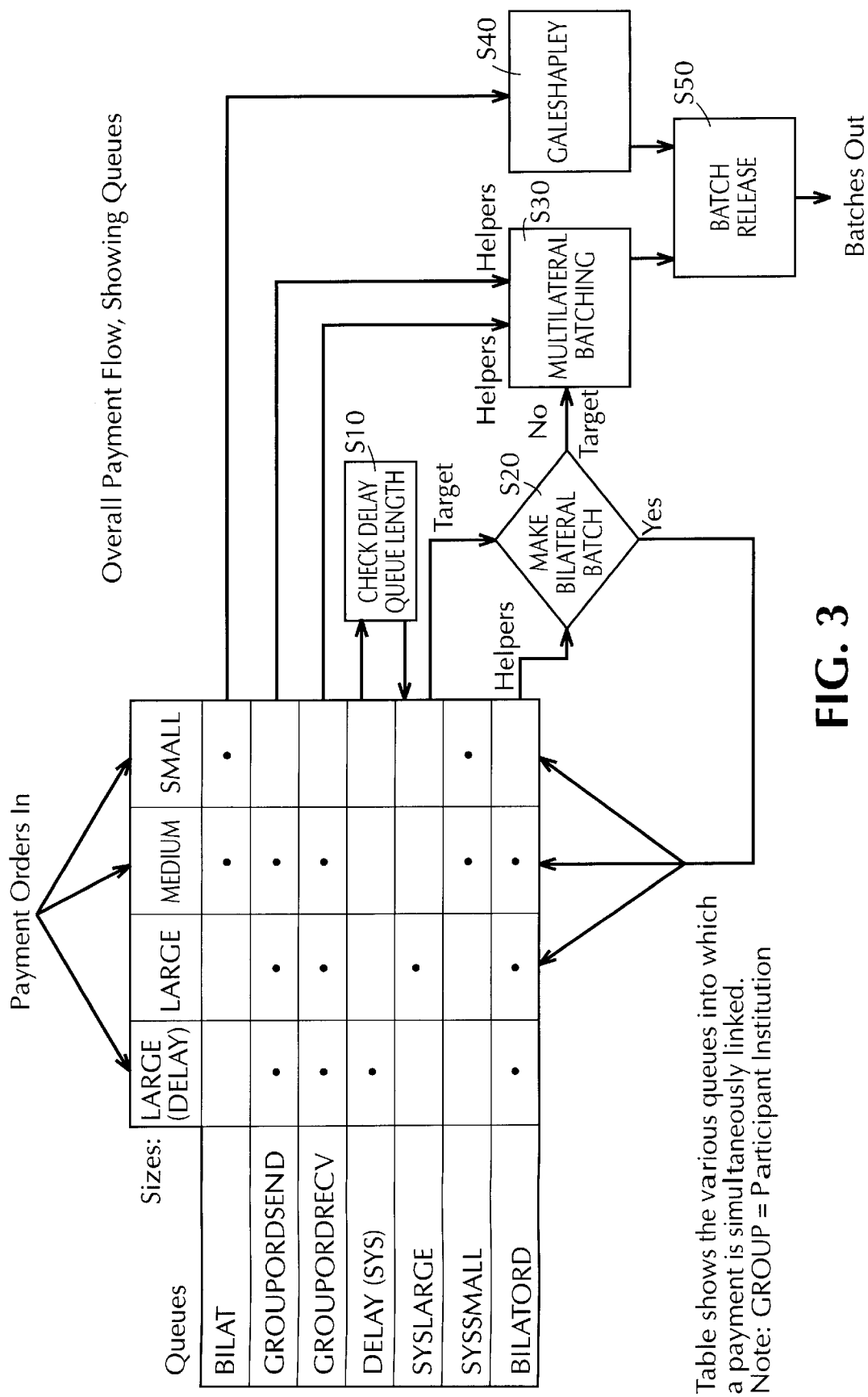
FIG. 3 is a flow chart illustrating the overall payment message flow of the balanced release engine.

FIG. 3 illustrates the overall process flow of the Balanced Release Engine. In this figure, the queue structures are represented in matrix form to show that a payment may simultaneously be linked to more than one queue.

An incoming payment order is initially placed on various ones of queues BILAT, GROUPORDSEND, GROUPORDRECV, DELAY (SYS), SYSLARGE, SYSSMALL or BILATORD, depending upon the size of the payment order. In the description of FIG. 3, and in a preferred embodiment of the present invention, small payment orders, i.e., payment orders whose dollar values are less than 80% of the lower of the initial prefunded balances of the sender and receiver, are further subdivided into two categories: medium payment orders, i.e., payment orders that are between 20% and 80% of the lower initial prefunded balance requirement, and small, or more specifically "very small" payment orders, i.e., payment orders that are less than or equal to 20% of the lower initial prefunded balance requirement. Note that when the term "small" is used together with the term "medium" to describe payment order size, small is being used to refer to "very small" payment orders. On the other hand, where the broad categories small and large are being described, "small" refers to all payment orders less than 80% of the lower of the initial prefunded balance requirements of the sending participant and the receiving participant.

Payment orders characterized as small, or more precisely, very small, are placed both in the BILAT and SYSSMALL queues. Medium sized payment orders are placed simultaneously in the BILAT, GROUPORDSEND, GROUPORDRECV, SYSSMALL and BILATORD queues. Large incoming payment orders are initially placed in the DELAY(SYS) queue as well as the queues GROUPORDSEND, GROUPORDRECV and BILATORD. All such payment orders can be used as helpers. Finally, large payment orders that have passed through the delay queue, as well as large pseudo-payments, are placed in the queues GROUPORDSEND, GROUPORDRECV, SYSLARGE and BILATORD.

The queues shown in the flow chart will now be described. All queues with the suffix "ORD", such as GROUPORDRECV or GROUPORDSEND, are ordered queues, arranged in dollar size order, with largest payment orders at the head of the queue. Other queues are FIFO queues. For example, BILATORD is an ordered queue that stores only medium and large payment orders between a particular bilateral pair of participants. BILAT is a FIFO queue storing medium and small payment orders between a particular bilateral pair of participants.

All queues with the prefix GROUP contain only payment orders for a particular participant. If this prefix is followed by the suffix SEND, it contains payment orders by a particular participant, if followed by the suffix RECV, it contains payment orders to a particular participant. Thus, GROUPORDRECV is an ordered queue containing payment orders to a particular participant, whereas GROUPORDSEND is an ordered queue containing payment orders sent by a particular participant. The prefix SYS denotes a queue that contains payment orders for all participants. Following this convention, the SYSLARGE queue contains all large payment orders and SYSSMALL contains all small payment orders. DELAY(SYS) is a FIFO queue that contains all recently queued large payment orders.

The functions of the individual queues will be further described in Table VI below.

Small and medium payment orders (i.e., all payment orders less than 80% of the flow cap) may be eligible for release without batching. This release is performed using the Gale Shapley algorithm, indicated at step S40, to be explained in detail below. As is shown at step S10, the DELAY queue length is continuously checked. If the maximum DELAY queue length is set, for example, to be 400 payment orders, the insertion of another large payment order will cause the removal of the oldest payment order from DELAY. After an appropriate delay, the payment orders on the DELAY queue are placed on the SYSLARGE queue.

As discussed above, bilateral batching may be utilized to combine a target payment in the SYSLARGE queue with a helper payment from the BILATORD queue.

As shown in the figure, if it is determined at step S20 that bilateral batching can be achieved, a pseudo-payment, equal to the difference between the target and helper payment, and in the direction of the larger of the two, is formed. The formed pseudo-payment is placed back into the appropriate queue or queues according to size.

Multilateral batching may be used to release large payment orders larger than the flow cap, even much larger than the flow cap. As shown in FIG. 3, a target payment order that cannot be bilaterally batched is passed at S30 to the procedure for multilateral batching. The multilateral batching procedure attempts to build a tree or trees of payment orders by offsetting the target payment order with helper payment orders, as discussed extensively above. As is shown in FIG. 3, helper payment orders can come from queues GROUPORDSEND and GROUPORDRECV. Upon successful completion of the multilateral batching procedure, all of the batched payments are released in a single transaction at step S50. Upon release of a payment order, it is removed from all queues. Although FIG. 3 illustrates an embodiment in which both bilateral and multilateral batching are used, the present invention can perform its functions without using bilateral batching at all, since even the largest payment orders can be set off and multilaterally batched by the multilateral batch procedure. Therefore, the present invention is not limited to the embodiment that includes the optional bilateral batching procedure.

VI. REVIEW OF THE SIMULATION RESULTS

Simulations of the system of the present invention and its execution of the process performed by it were performed based upon transaction data for a variety of dates, chosen either because that day's system activity was notable in some way, or to establish a baseline of typical activity. Since the preferred embodiment of the present invention is suitable for use, for example, in conjunction with CHIPS computer hardware, CHIPS data was used for the simulation. The dates and the reasons why they were chosen are shown in Table I as follows:

TABLE I

| Date | Reason Chosen |
| --- | --- |
| January 21, 1997 | Day after the 3 day Martin Luther King Day weekend. That date had the highest volume recorded on CHIPS up until then. |
| March 27, 1997 | The Thursday before Good Friday. Because much of Europe was to be closed for Good Friday, this was effectively the last business day of the quarter in these countries. Hence, the usual as elevated quarter-end CHIPS volume was observed on that day. |
| March 31, 1997 | This was Easter Monday, which is a holiday in Europe, and a low volume day for CHIPS. |
| April 11, 1997 | That day, one of the participants had an usually large credit position. |
| May 27, 1997 | The day after the Memorial Day Weekend. CHIPS had the usual post-holiday (heavy) volume that day. |
| June 16, 1997 | A typical day for CHIPS. |
| June 18, 1997 | A typical day for CHIPS. |
| July 3, 1997 | This was the day before the Independence Day Weekend. CHIPS had the elevated volumes typical for the day before a holiday. |
| November 28, 1997 | This was the day after Thanksgiving. CHIPS volume was at a historic high for that day. |

A measure of the quality of the actual process used is the actual percentage of the dollars sent that were released. The results for each of the above dates are shown in Table II as follows:

TABLE II

| Date | % Dollars Released | Total Number of Pmt. Orders (x $10^5$) | Total of Pmt. Orders (x $10^{12}$$) |
| --- | --- | --- | --- |
| 21-Jan-97 | 96.23% | 4.187 | 2.178 |
| 27-Mar-97 | 95.79% | 2.716 | 1.856 |
| 31-Mar-97 | 91.45% | 1.040 | 0.509 |
| 11-Apr-97 | 95.38% | 2.330 | 1.416 |
| 27-May-97 | 95.62% | 3.967 | 2.039 |
| 16-Jun-97 | 95.88% | 2.579 | 1.594 |
| 3-Jul-97 | 94.89% | 2.289 | 1.467 |
| 28-Nov-97 | 97.48% | 4.570 | 2.237 |

Two conclusions can immediately be drawn from these results:
1. Almost all of the payment orders that could be released were, in fact, released. The dollar weighted criterion is a stringent one, because the payment orders receiving the most weight are the orders that are much larger than the pre-funded amounts, and are thus the hardest to handle.
2. The system, as simulated, worked best, in the sense of being closest to its "theoretical limit, balanced releasable dollars, percent" figure, on days when the volume is the highest. The experience of the simulation shows that the dollar volume of payments unreleased after cutoff is nearly independent of daily dollar volume. So the former decreases as a percentage of the latter as the latter increases. The "theoretical limit" is designed to show the dollar percentage that would have been released if the same dollar totals were released by each bank in payments of small dollar size.

A numerical experiment suggests the reason for the success of the system: very often, a payment from one participant to another tends to trigger a payment from the second participant to a third participant, and so on. This point was established with the June 18 data by first netting the actual payments to and from each participant and then comparing the net changes in the participants' available balances to the changes that would accrue if the payments had been made to random receivers. On a typical run, the actual change in position is almost always tens, if not hundreds or thousands, of times smaller than the corresponding randomized change. Fortunately, these payment patterns seem to be intrinsic to the way in which CHIPS is used, so the dependence of the program on such patterns should not create difficulties.

However, the above statistics average over payments of all sizes, participants of all sizes, and all times of the day. A specific participant's perceptions of the system will be shaped by his ability to get the system to process a payment order for a specific amount at a particular time.

A detailed examination of the simulation outputs show that most individual participants are served by the system about as well as the aggregate numbers predict. However, at the end of any given day, a significant percentage of a few participants' payment orders remain unprocessed, even on Nov. 28, 1997, the date on which the system, as simulated, performed the best.

A particularly telling measure of the throughput of the system is the dollar weighted percentage of payment orders from each participant that were not released by the simulation. If the program model had actually processed the workflow for Mar. 27, 1997, for example, there would have been four participants that would have had more than 50% of their dollar weighted payment flow remaining on the queue until the end of the day. These were participants identified by ABA (American Banking Association) numbers A, B, C, and D. Some relevant statistics are shown in Tables III and IV as follows

TABLE III

| ABA # | A | B | C | D |
| --- | --- | --- | --- | --- |
| Cap (millions) | 28.05 | 10 | 25.5 | 25.5 |
| Amt, pmt orders sent | 71.03 | 116.91 | 742.43 | 463.05 |
| Amt, pmt orders rec'd | 13.5 | 47.55 | 421.14 | 256.44 |
| Amt, large orders sent | 45 | 37.66 | 669.17 | 400.96 |
| Amt, large orders rec'd | 0 | 16.11 | 360.84 | 230.04 |
| Amt, small orders sent | 26.03 | 79.25 | 73.26 | 62.09 |
| Amt, small orders rec'd | 13.5 | 31.44 | 60.3 | 26.4 |
| Ratio, sent/rec'd | 5.261 | 2.459 | 1.763 | 1.806 |

TABLE IV

| ABA # of 4 randomly chosen participants | E | F | G | H |
| --- | --- | --- | --- | --- |
| Cap (millions) | 10.2 | 15.29 | 38.25 | 127.5 |
| Amt, pmt orders sent | 2276.07 | 11427.82 | 2944.07 | 107495.9 |
| Amt, pmt orders rec'd | 2126.35 | 11405.97 | 2734.84 | 106617.5 |
| Amt, large orders sent | 1519.42 | 9207.76 | 1806.93 | 56683.22 |
| Amt, large orders rec'd | 1544.58 | 9305.62 | 1606.73 | 57328.35 |
| Amt, small orders sent | 756.65 | 2220.06 | 1137.14 | 50812.69 |
| Amt, small orders rec'd | 581.77 | 2100.35 | 1128.11 | 49289.17 |
| Ratio, sent/rec'd | 1.07041 | 1.00192 | 1.07651 | 1.00824 |

The difference between those participants that are treated well by the system and the participants that are not seems to be the noticeable differences in the ratio of dollars sent to dollars received. For most participants, including the four that were randomly chosen, this ratio is very close to one.

However, this was not true for all participants. Clearly, no system of this type can effectively deal with such imbalances, and, so far as can be determined by the results, it is only systems of this type that would permit intraday finality with small fixed funding. Therefore, it appears that the inevitable price to be paid for intra-day finality with small funding is that the few participants with an imbalance of send and receive orders are likely to have to wait until the end of the day to have these orders processed.

Most payment orders are "small," in the sense that they are less than 80% of the lower of the sender's and receiver's initial prefunded balances. The bottleneck in such a case is the Gale-Shapley algorithm. As is discussed below, the worst case performance of this algorithm is proportional to the cube of the number of participants in the system.

The simulations show that most batches will have only a single payment (If the simulation code can complete all processing of 400,000 payment orders in half an hour, then the time required per order is less than 0.005 seconds. On the other hand, the available time per order is more than 0.06 seconds, assuming 400,000 payments and that no participant signs on before the required 9 AM deadline.)

The only immediate action required of the system upon receipt of a large payment order is to place it on the delay queue, which is clearly not a bottleneck. When a payment is released from the delay queue, it is placed on the large payment queue and the appropriate bilateral queue. The time required to do this depends on the current size of these queues. The queue size is a complicated function of the detailed composition of the workflow, the rate at which payment orders can be released, and the implementation details of the queue. Nevertheless, the queue operations require CPU time at most proportional to the length of the queue. In the simulation code, queues are implemented as simple linked lists, as opposed to some more CPU-efficient data structure, because the queue operations do not seem to be a bottleneck. These more efficient data structures are, in fact, much more efficient, so that any future problems in this area could easily be solved.

The multilateral batching procedure requires the construction of a tree containing participants in a credit position and a tree containing participants in a debit position, where credit and debit are relative to the beginning-of-day positions. In the model code embodiment, both the number of institutions per node and the depth of these trees cannot exceed hard coded limits, so that the only variable in the time required to build them is, once again, the time required to perform queue operations. The amount of backtracking that occurs following failed attempts at tree building seems to be a rather constant percentage of the total work. Thus, the multilateral batching system is unlikely to be a bottleneck.

This analysis is, to some degree, confined by the simulation results: the CPU time required to process March 31 workflow was not dramatically different than the CPU time required to process the November 28 workflow, even though there were more than four times as many payment orders on the latter date.

The simulations assume that the amount of prefunded balances that each participant has posted is equal to collateral it currently posts to the CHIPS Collateral Account. However, there is no reason why this needs to be true. In fact, nothing in the system prevents the arbitrary setting of collateral requirements.

VII. CONCLUSIONS

1. The simulation results show that:
   a. The system can process almost all of the payment orders for almost all participants.
   b. The system works best on days when the volume is the highest.
   c. There are occasional clusters of unreleased payments to or from participants with an imbalance between "send" and "receive" payment orders. This seems to be unavoidable.

2. The success of the system is based on two statistical features of the payment order mix:
   a. A payment order from participant A to participant B makes a subsequent payment order from B to participant C more likely.
   b. Most of the payment orders are made by the largest participants.

3. Releasing payments via the Gale-Shapley algorithm has three advantages over a more straightforward approach:
   a. By keeping small payments in bilateral queues and using bit masks to identify which participants currently have releasable payments, the processor time required to find the oldest payments to release is greatly reduced.
   b. The Gale-Shapley algorithm can identify a batch of payments to "nearly disjoint" sender/receiver pairs, in a sense defined below. In general, the decision to release a payment would have to take in consideration the effects of all other payments being released at the same time. Otherwise, the release of one payment might result in a violation of funding constraints when a second payment is released, even if the second payment would not have violated funding constraints if it had been released in isolation. This would obviously not be a problem for a batch of disjoint senders and receivers. In fact, "near disjointness," in which a participant can both send and receive exactly one payment, is sufficient to avoid the problem. This is because a participant that could send a given payment or receive a given second payment without violating funding constraints could both send and receive these payments without violating funding constraints.
   c. By releasing a near disjoint batch of payments at once, as opposed to successive release of the individual payments in the batch, the throughput of the system is improved. This is because the processing of the payments after release can be done in parallel by the different participants' payment systems, but the determination of which payments to release is an inherently serial process.

4. Given the above, the inventors have concluded that the inventive system could indeed be implemented in conjunction with CHIPS in its current form.

VIII. THE MODIFIED GALE-SHAPLEY ALGORITHM

The need for such an algorithm used in the system of the present inventions has just been explained in section VII 3. Then the performance characteristics of this particular algorithm are discussed. In particular, it is shown that the algorithm is a natural generalization of the first-in-first-out (FIFO) queue discipline.

Since time stamps are unique, that is, since the time at which a payment order is received is unique to that payment order, a payment order and its time stamp can be used interchangeably, a convention to be used throughout. For purposes of scheduling, then, the only additional information needed is a matrix similar to that shown below in Table V, for participants P1, P2, P3, and P4 out of a set, Π, of participants. Along the rows, the given participant is the sender; along the columns, the given participant is the receiver. The numbers in the entries are the time stamps of the "releasable payment orders," the first of the hypothetical payment orders from that sender to that receiver provided that the order satisfies the pre-funding or credit constraints. The absence of time stamps in the blank boxes indicates that either there was no payment order for that sender-receiver pair or the first payment order for the pair was not releasable.

TABLE V

|    | P1  | P2  | P3  | P4  |
|----|-----|-----|-----|-----|
| P1 |     | 373 | 273 | 879 |
| P2 | 237 |     |     | 690 |
| P3 | 946 | 505 |     | 436 |
| P4 |     | 430 | 120 |     |

As was discussed above, more than one of these payment orders can and should be released simultaneously. However, only "near disjoint" batches of payment orders, in which each participant is to send or receive (or both send and receive) at most once per batch can be processed without re-computation of funding constraints. Near disjointness requires that the time stamp labeled payment orders in the matrix must be chosen such that they occupy at most one cell per row and at most one cell per column. Furthermore, no payment order can correspond to a cell on the diagonal of the matrix because such diagonal cells would correspond to participants sending payments to themselves.

In the special case where only the diagonal cells in the time stamp matrix are empty (i.e. where any sender has a releasable payment order for any receiver), selecting the orders that are to be included in a given batch can be viewed as choosing a function that maps the set of senders onto the set of receivers. Each such function represents a derangement of the integers 1, 2, ..., N, which is a permutation of these integers in which no integer is mapped to itself. In the limit of large N, there are, N!/e such derangements, where e≈2.718 (the base of natural logarithms). This quantity grows extremely fast as N increases. For example, it is already about 1.3 million when N=10.

Fortunately, an elegant solution to the generic problem of this kind, the "marriage problem," was given in the January 1962 issue of the "American Mathematical Monthly" by D. Gale and L. S. Shapley. Their algorithm, now known as the Gale-Shapley algorithm, pairs N men and N women as married couples, given the respective preferences of the men and women. The algorithm is given the respective preferences of the men and the women, but, as in life, the woman that a particular man wants to marry most is not always going to want to marry that man more than any of the others. To deal with this problem, the algorithm proceeds as follows:

1. The men proceed downward from their most desirable to least desirable spouse, asking each, in turn, to marry him.
2. When asked, the women say either "no" or "maybe" respectively, in accordance with whether they do or do not have men on the string ("maybe" status) who are preferable in their eyes to the current suitor. If she says no, then the man is free to ask someone else. If she says maybe, then he cannot. When a woman says maybe to a new man when she already has another on the string, she also says no to the latter.
3. When there are no more proposals, each woman says "yes" to the (one) man she still has in "maybe" status. The resulting matches have the following desirable properties:

1. They are "stable," in the sense that no "adulterous" man-woman couple can be found that would prefer each other to their assigned spouses. Indeed, if a man prefers another woman to his own wife, the Gale-Shapley algorithm guarantees that he must have unsuccessfully proposed to the other woman before proposing to his wife.
   2. They are "optimal" among stable pairings, in the sense that no man would prefer any other stable pairing.

The problem of pairing payment senders with payment receivers differs from the published Gale-Shapley algorithm in the following ways:

1. The algorithm assumes that it is the men that "bid" for the women's hands, but it is not obvious whether senders or receivers should bid.
2. Each participant can act as both a sender and receiver of payments, and can, therefore, be both a "bidder" and a "biddee." Thus, the participants are analogous to families containing exactly one brother and exactly one sister, who cannot marry each other. A set of payments in which a given bank appears at most once as a sender and at most once as receiver will be called near disjoint in what follows.
3. A given entity need not be either a bidder or a biddee at any given time.

Nevertheless, the program code implements the following version of the Gale-Shapley algorithm, whose optimality properties will be explored shortly.

1. On alternate calls to the algorithm, senders and receivers are designated as bidders. This alternation scheme is part of a feature, discussed later, to increase processor efficiency. This feature uses the SENDERSTATE and RECEIVERSTATE bit masks.
2. The bid made by each bidder is determined by finding that payment order with the smallest time stamp, among those releasable payment orders that:
   a) appear at the heads of bilateral queues in which the bidder is the sender or receiver, as appropriate.
   b) have not been involved in previous rejected bids.

As in the published algorithm, the corresponding "biddee" tentatively accepts the bid if it is either the biddee's first bid or an improvement over its current bid. Otherwise, the bid is rejected, at which point the bidder is free to bid again.

When there are no more bids, either because all bidders have been matched with a biddee, or because no matches can be found for all remaining bidders, the tentative assignments are finalized.

As an example, consider the matrix presented above, Table V. If senders bid, they will bid to make the payments with the earliest time stamps (marked with horizontal lines) along each row. If receivers bid, they will bid to make the payments with the earliest time stamps (marked with vertical lines) along each column.

The bidding proceeds as follows:

Sender bids:

1. P1 bids to send a payment to P3, and is put in "maybe status" by P3.
2. P2 bids to send a payment to P1, and is put in "maybe status" by P1.
3. P3 bids to send a payment to P4, and is put in "maybe status" by P4.
4. P4 bids to send a payment to P3. Because this payment has an earlier time stamp than that of P1 to P3, that latter payment is dropped.

In a second round, P1 would bid to send to P2; P2 receives no other bids.

The payments released are therefore 2→1, 3→4, 4→3, and 1→2. Note that all four participants both send and receive a payment.

Receiver Bids: If instead the receivers had been bidding the sequence would have been thus 1. P1 bids to receive a payment from P2, and is put in "maybe" status by P2.

2. P2 bids to receive a payment from P1, and is put "in maybe" status by P1.

3. P3 bids to receive a payment from P4, and is put in "maybe" status by P4.

4. P4 bids to receive a payment from P3, and is put in "maybe" status by P3.

The payments released are therefore 2→1, 1→2, 4→3, and 3→4. This is the same set of payments as was obtained with the senders bidding, though in this case no second round of bidding was required. We will see later why the same set is obtained.

The algorithm must terminate in at most $O(N^3)$ steps, where N is the number of participants. This follows immediately from the nature of the algorithm itself:

1. Each bid is determined by examining at most N time stamps.
2. There are a maximum of N bids per bidder.
3. There are n bidders.

It also follows immediately that the algorithm produces near-disjoint batches, as there can be at most one accepted bid per biddee, and each bidder can make at most one bid at a time.

The modified Gale-Shapley algorithm is a generalization of "first-in-first-out" (FIFO) processing, a property that is analogous to the "stability" of the published algorithm. The precise nature of this FIFO generalization is the content of the following.

Definition: Let To be a set currently releasable payments. A near disjoint batch R of payment orders, a subset of $T_0$, is generalized FIFO if, for every payment $t_{pq}$ in $T_0$ not included in the batch R, either the sender, p, has an earlier payment in the batch, or the receiver, q, has an earlier payment in the batch.

We then have the following:

Theorem: Let $t_{ij}$ be the (unique) time stamp of the releasable payment order involving sender i and receiver j, let $T_0$ be the set of all currently releasable payment orders, or, equivalently, the set of all possible $t_{ij}$'s, and let $R \subset T_o$ be the set of time stamps of payment orders actually chosen for release. Then R is generalized FIFO.

Proof: Assume that the sender is the bidder, as the argument needs to be changed in only the most obvious ways if the receiver is the bidder. Suppose To and R are as in the theorem hypothesis. To prove that R is generalized FIFO, suppose that $t_{pq}$ i in $T_0$, but $t_{pq}$ is not in R. There are two cases:

(1) Sender p never makes a bid to receiver q. Then by the algorithm, p must be in "maybe" status with some receiver j.

But this means that $t_{pj} < t_{pq}$.

(2) Sender p bids receiver q at some point in the bidding. Then $t_{pq}$ was the payment bid, as it is at the head of its queue. Evidently q must have rejected the bid for something better, so q must have had, or later received, a better offer $t_{iq} < t_{pq}$.

So the generalized FIFO condition is met.

The optimality property of the published algorithm for bidders continues to hold for the modified algorithm, as shown by the following Theorem: The bidder's payment orders get released at least as soon using the modified Gale-Shapley algorithm as they would using any other algorithm that produces generalized FIFO batches.

Comment: Since "generalized FIFO" here corresponds to "stable assignment" in the Gale-Shapley paper, this theorem is a corollary of their result that the assignment resulting from the algorithm is optimal for the bidders. The proof that this is true at each application of the method may be extended to a proof for a sequence of applications of the algorithm by mathematical induction.

When matching men to women as in the Gale-Shapley paper, each person has his or her own unique ranking of persons of the opposite sex. In this situation, the stable assignment that results when men bid may be different from the one that results when women bid, as is shown in that paper. Here, however, we have specified that all senders and all recipients rank each other on the basis of the time-stamp of the payment at the bilateral queue head, with older payments ranked higher than more recent payments. In this situation it turns out that there is only one maximal stable assignment. Thus the Gale-Shapley algorithm must always find this same assignment whether senders bid or receivers bid. A proof of this assertion is not given here, though it is not difficult. Only a direct construction of the unique maximal stable assignment that does not use the Gale-Shapley algorithm is given. Using this construction, it is not difficult to supply the details of a proof.

Let $T_0$ be the set of payments releasable at a particular time. Since each payment is at the head of a bilateral queue, no two payments in $T_0$ have the same sender and receiver. We assume that $T_0$ is non-empty. Let $(S_0, R_0)$ be the earliest payment in $T_0$, where $S_0$ denotes the sender and $R_0$ denotes the receiver.

Now suppose that $T_k$ and $(S_k, R_k)$ have been defined for some k. For k+1 we proceed as follows. Let $T_{k+1}$ be the set of all of the payments in $T_k$ except those payments that have $S_k$ as a sender or $R_k$ as a receiver. Then if $T_{k+1}$ is empty, stop. Otherwise, let $(S_{k+1}, R_{k+1})$ be the earliest payment in $T_{k+1}$, and continue.

The unique maximal stable assignment is the set consisting of all of the payments $(S_k, R_k)$ so chosen. Notice that $(S_0, R_0)$ is the earliest payment in $T_0$. So (assuming the assertion is true as claimed) the Gale-Shapley algorithm will always find the oldest releasable payment. This is the primary reason for using the Gale-Shapley algorithm in this invention. It provides an efficient way to find this earliest payment. If one simply loops through a system queue of payments looking for the earliest releasable payment, the search might take a long time. By using bilateral queues with the Gale-Shapley algorithm the same thing is accomplished much more quickly.

IX. DOCUMENTATION OF AN IMPLEMENTATION OF THE PROGRAM MODEL IN UNISYS ALGOL

This section describes the major inputs, internal variables, and processing steps of an implementation of the program model. Only those portions of the code that implement the release functions are discussed here. Although the description of the model code relates to a preferred embodiment of the present invention, the invention is not limited to the described implementation.

First, an overview of the inputs and processing steps will be given. Then, a description in more detail as to how the various queues are implemented and how the INSERT procedure populates them will be provided. Third, a description as to how MAKEBILATERALBATCH, the bilateral batching procedure, and the multilateral batching procedures, CHECKBATCHES, BATCHRELEASEABLE, CHECKSENDPAYMT, and CHECKRECVPAYMT, create their respective batches is provided. Fourth, and finally, a description as to how payment orders are released for processing by either BATCHRELEASE (for multilateral batches) and RELEASEBILATERALBATCH (for bilateral batches) or GALESHAPLEY and RELEASELOOP (for single payment orders) is provided.

A. Overview

Each payment order is input as a record, sorted by release time, consisting of a code for the sending participant a code for the receiving participant a time stamp, or SSN (system serial number), marking the time at which the payment order was released for processing.

an amount.

Given these inputs, the processing of the payment orders proceeds as per the following pseudo-code.

READ collateral amounts FROM collateral file, SORTING BY ABANumber IF NOT ALREADY SORTED
       notfinal←TRUE
       WHILE NOT END-OF-FILE (payment order file) OR
    notfinal % Loop here to process incoming payment orders.
       READ payment order FROM payment order file
       IF NOT END-OF-FILE(payment order file) THEN
          INSERT payment order INTO queues % NOTE: Any bilateral batching with previously queued payments is done as part of the insertion process. Bilateral batching is only possible if there is a payment order already on the queues that is between one half and 2 times as large as the order just read. Also, the simulation time is advanced to the time of the payment.
       ELSE
       notfinal←FALSE
       no_credit_limits←TRUE
       empty delay queue
       % after cutoff, the credit limit restrictions are removed
       END IF
       IF largeflag THEN
       % i.e. payment order>0.8*pre-funded amount for order just read
          IF checkbatches THEN
          % Procedure checkbatches returns a boolean of the same name that will be TRUE if the large payment order is released as part of a multilateral batch. Hence, largeflag, which indicates that the large payment has yet to be processed, is reset below: largeflag:=FALSE
       END IF
       IF largeflag OR small_payment OR no_credit_limits
       THEN DO % Loop over payments that may be releasable now. There may also be other releasable payments if no_credit_limits is TRUE. The Boolean quantities largeflag and small_payment are set true in procedure INSERT according as the new payment is large or not.
          IF small_payment THEN
             IF try_to_release THEN
          % try_to_release returns TRUE only upon release of all small payments.
                small_payment:=FALSE
             END IF
          END IF
          IF no_credit limits THEN
             IF NOT checkbatches THEN
                small_Payment:=TRUE
          END IF
       UNTIL small payment=FALSE
       END WHILE % End of loop over payment orders in order file
       FINALRELEASES % Release payments remaining on the queues at the end of the day
       PRINTSUMMARY % Print the results of the simulation The PMT Data Structure, Queue Operators, and the INSERT Procedure As the above code sketch shows, an important first step in processing payment orders is to set up the queues appropriately, a task that is performed in the INSERT procedure. Table VI and the accompanying notes describe the queues in detail.

ALGOL only supports ordinary arrays, so this is how the queues must ultimately be implemented. The implementation details are, however, carefully hidden from the procedures that use these queues by DEFINE's that perform the standard queue operations. Thus, the procedures can treat these queues as standard doubly linked lists, with separately maintained heads and tails. However, some of the queues are ordered; because it is open appropriate to insert or delete intermediate nodes the others are FIFO.

The underlying array for all of the payment queues has the declaration

ARRAY PAYMENTQUEUE[0:999000]

which is referenced by the basic DEFINE's

DEFINE
   PAYMTSZ=9#
   ,PMT(LINK,I)=PAYMENTQUEUE[PAYMTSZ*
      (LINK)+(I)]#

This has the effect of creating queue nodes, each of nine words (with 48 bits to a word), which can be referenced by the subscript LINK. The other subscript, I, is used only in the subsequent level of DEFINE's, which manages the queues as they are actually used, e.g.

DEFINE
   SNDR(LINK, PMT)=PMT[LINK, 0]. [47:12]#

This is the DEFINE for the sender queue, which allocates bits 36 (i.e. 47–12+1) through 47 of the first word of the node (ALGOL indexes typically start at zero, and that the notation".[47:12]" is the Unisys ALGOL convention for specifying the twelve bits with bit 47, i.e. the most significant bit, as the first (or leftmost) bit.). There are similar DEFINE's for the other queues, resulting-in the allocations shown in Table VI:

TABLE VI

| Queue Name | Word # | Bits (using ALGOL convention) | Meaning |
|---|---|---|---|
| SNDR | 0 | 47:12 | An index indicating which participant is to send the payment order. |
| RCVR | 0 | 35:12 | An index indicating which participant is to receive the payment order. Participants are assigned these indices when the cap file is read. |
| QTIME | 0 | 23:12 | Time when the payment order was received. |
| QFLAGS | 1 | 47:8 | Flags indicating which queues to which this node is linked. |
| LARGE AMOUNT | 1 | 39:2 | Bit 38 it TRUE if this node is a large payment order. |
| BILATERAL BATCH | 1 | 36:1 | TRUE if this node is a part of a bilaterally batched pseudo-payment. |
| SSN | 1 | 23:24 | System Sequence Number (SSN) of the payment order, i.e. the order in which it was received by the system. |

TABLE VI-continued

| Queue Name | Word # | Bits (using ALGOL convention) | Meaning |
|---|---|---|---|
| AMOUNT | 2 | entire word | The amount of the payment, in cents. |
| SYSLINCK | 3 | 47:24 | This and SYSBACKLINK allow for all payment orders to be ordered by SSN, according to a doubly linked FIFO queue discipline. |
| SYSBACK LINK | 3 | 23:24 | (see above) |
| PSEUDO HEAD | 4 | 47:24 | If this payment order is a pseudo-payment queue, the head of its queue, the bilateral batch. |
| PSEUDO TAIL | 4 | 23:24 | If this payment order is a pseudo-payment queue, the tail of its queue, the bilateral batch. |
| GROUP ORDSEND LINK | 5 | 47:24 | This and GROUPORDSENDBACKLINK allow for payment orders made on behalf of a specific participant (or "group") to be ordered by size, according to a doubly linked FIFO queue discipline. Used in multilateral batching. |
| GROUP ORDSEND BACKLINK | 5 | 23:25 | (see above) |
| GROUP ORDRECV LINK | 6 | 47:24 | This and GROUPORDRECVBACKLINK allow for payment orders made for the benefit of a specific participant (or "group") to be ordered by size, according to a doubly linked FIFO queue discipline. Used in multilateral batching. |
| GROUP ORDRECV BAKCLINK | 6 | 23/24 | (see above) |
| BILATORD LINK | 7 | 47:24 | This and BILATORDBACKLINK allow for payment orders made from a specific sending participant to a specific receiving participant to be ordered by size, according to a doubly linked FIFO queue discipline. Used in bilateral batching. |
| BILATORD BACKL INK | 7 | 23:24 | (see above) |
| BILAT LINK | 8 | 47:24 | This and BILATBACKLINK allow for payment orders made on behalf of a specific participant (or "group") to be ordered by SSN (system sequence number), according to a doubly linked FIFO queue discipline. Used for release of small payments. |
| BILAT BACKLINK | 8 | 23:24 | (see above) |

Nodes are added by the GETSYSLINK DEFINE, which returns in its argument, LINK, a currently unused position in the PMT array. If all positions that have ever been used are still in use (i.e. AVAILLINK=0), GETSYSLINK need only set LINK to the first empty position in the PMT array. GETSYSLINK implements this operation by incrementing LEFTOFFLINK, which is the last link that is currently in use, and then making the assignment

LINK←LEFTOFFLINK

Otherwise, GETSYSLINK sets LINK to the position in the PMT array pointed to by AVAILLINK.

Nodes are deleted from this structure by the FORGETSYSLINK DEFINE, which sets to zero all words in the position in the PMT array pointed to by its argument, LINK. The assignments

SYSLINCK(LINK)←AVAILLINK AVAILLINK←LINK

Each of the basic queue operations is supported by a basic DEFINE, as given in Table VIII. In this table, LINK is a reference to a node in the above data structure; NEXTLINK and subsequent link references are formal parameters that will be substituted when the DEFINE is actually used. For example, SYSINSERT is a DEFINE that invokes INSERTDEF to insert a link into the queue of all unprocessed payment orders (the SYS queue). When SYSINSERT invokes INSERTDEF, NEXTLINK is replaced by SYSLINCK, and references in INSERTDEF such as NEXTLINK(LINK, PMT) will be replaced by SYSLINCK [LINK, PMT], which will then be replaced, as per the above, with PMT[LINK, 3].[47:24], etc. One or more ALGOL statements are substituted for the formal parameters QNONEMPTY and QEMPTY when these DEFINE's are invoked. As their names suggest, QNONEMPTY is to be substituted by statements to be executed when the queue becomes non-empty, and QEMPTY is to be substituted by statements to be executed when the queue becomes empty.

TABLE VII

| Define Name | Arguments | Queue Operation |
|---|---|---|
| INSERTDEF | LINK, PMT, NEXTLINK, BACKLINK, HEAD, TAIL, QNONEMPTY | Insert LINK at the end of the queue after (the current) TAIL, if any. Thus, NEXTLINK(LINK)←NULL BACKLINK(LINK)←TAIL NEXTLINK(TAIL)←LINK TAIL←LINK Finally, if the queue is initially empty (i.e., if HEAD is set to NULL), reset HEAD to LINK. |

TABLE VII-continued

| Define Name | Arguments | Queue Operation |
|---|---|---|
| PUSHDEF | LINK, PMT, NEXTLINK, BACKLINK, HEAD, TAIL, QNONEMPTY | Insert LINK at the beginning of the queue before (the current) HEAD, if any. Currently unused. |
| REPLACEDEF | LINK1, LINK2, PMT, NEXTLINK, BACKLINK, HEAD, TAIL, TEMPNL, TEMPBL | Replace link at LINK1 with the one at LINK2. Thus, NEXTLINK(LINK2)←NEXTLINK (LINK1) BACKLINK(LINK2)←BACKLINK (LINK1) NEXTLINK(BACKLINK(LINK1))←LINK2 BACKLINK(NEXTLINK(LINK1))←LINK2 and reset HEAD, TAIL if necessary. TEMPNL, TEMPBL are workspaces. |
| ORDINSERT | LINK, PMT, NEXTLINK, BACKLINK, HEAD, TAIL, QNONEMPTY, LINK1, DAMT, TEMP | Find smallest payment size larger than that found at LINK and insert LINK immediately after it, after adjusting HEAD, TAIL if necessary. LINK1, DAMT, and TEMP are workspaces. Linear search is used from the HEAD of the list to find the insertion point. |
| ORDPUSH | LINK, PMT, NEXTLINK, BACKLINK, HEAD, TAIL, QNONEMPTY, LINK1, KEY, TEMP | Find queue node whose SSN immediately follows that of LINK and insert LINK immediately before it, after adjusting HEAD, TAIL if necessary. LINK1, KEY, and TEMP are workspaces. Linear search is done from the HEAD of the list to find the insertion point. |
| REMOVEDEF | LINK, PMT, NEXTLINK, BACKLINK, HEAD, TAIL, TEMPNL, TEMPBL, QEMPTY | Remove LINK from the queue by adjusting the NEXTLINK and BACKLINK pointers, and reset HEAD, TAIL if necessary. TEMPNL, TEMPBL are workspaces. Note that the underlying array entry is not "reclaimed," as this is done in FORGETSYSLINK |

These DEFINE's are customized for specific queues by using the head, tail, etc., of the relevant queue. For example, BILATORDINSERT is another DEFINE that invokes ORDINSERT as follows:

ORDINSERT(NEWLINK, PMT, BILATORDLINK, BILATORDBACKLINK, BILATORDHEAD(SGRP, RGRP), BILATORDTAIL(SGRP, RGRP), QNONEMPTY, LINK1, DAMT, TEMP);

Although the INSERT DEFINE's are used directly by the program, the REMOVE DEFINE's are all invoked in the REMOVE routine. REMOVE is called with two parameters, LINK, which is the location of the node to be removed, and QFS, a bit mask of flags to indicate from which queues LINK is not to be removed. Recall that QFLAGS(LINK, PMT) is a bit mask of flags in each payment node that indicates the queues to which the node belongs. The queues from which LINK is to be removed are thus those queues for which the corresponding bit of QFLAGB, which is the bitwise AND of QFLAGS(LINK, PMT) and NOT QFS, i.e.

QFLAGB:=BOOLEAN(QFLAGS(LINK, PMT)) AND NOT BOOLEAN(QFS);

Clearly, QFLAGS(LINK, PMT) also needs to be updated. This is done by setting those QFLAGS bits of LINK to false that are FALSE in QFS, i.e.

QFLAGS(LINK, PMT) :=REAL(BOOLEAN(QFS) AND BOOLEAN(QFLAGS(LINK, PMT)));

The flag assignments are given in the Table VIII:

TABLE VIII

| Position | Name | Meaning |
|---|---|---|
| 0 | SYSQF | Member of the SYSQUEUE |
| 1 | GRPORDQF | Member of the GRPORDRECVQUEUE and the GROUPORDSENDQUEUE |
| 2 | BLTORDQF | Member of the BILATORDQUEUE |
| 3 | MEDIUMQF | Member of the BILATMEDSMALLQUEUE |
| 4 | GRPLGEQF | UNUSED |
| 5 | DELAYQF | Member of the DELAYQUEUE |
| 6 | SYSSMALLQF | Member of the SYSSMALLQUEUE |
| 7 | SYSLARGEQF | Member of the SYSLARGEQUEUE |

Thus, a call to REMOVE with QFS="C1" hex will remove a node from all queues except for the SYSQUEUE, the SYSSMALLQUEUE, and the SYSLARGEQUEUE. Note, however, that the node will not be erased from the PMT array unless FORGETSYSLINK is called. That only happens if the sign bit of QFS is set to FALSE (i.e. QFS, when interpreted as a floating point number, is positive).

Payment orders first enter the model via the statement

WHILE NOT (EOF :=READ(SORTEDPAYMENTSIN, 3,REC)) . . .

This code fragment sets the BOOLEAN variable EOF to either TRUE or FALSE, depending on whether an attempt to read three words from SORTEDPAYMENTSIN results in an end-of-file condition. If not, these three words, each of 6 bytes, are stored in REC.

The process of inserting the new payment order into the queues actually begins with the call

FORMATPAYMT(REC, PAYMT);

This procedure reformats the payment data as it is stored in REC into a queue node of the kind described above. PAYMT is a global array of 9 words that is used for temporary storage of the node. The individual fields in the input record, each of which is a HEX digit, are read by address equating REC to a HEX array, RECH.

The first task that is handled by INSERT itself is that of creating a permanent place for the currently processed payment order by calling GETSYSLINK. After setting the RECEIVERSTATE and SENDERSTATE bits, the flow cap, and the small cap, INSERT advances the simulation time to that of the payment.

It may be the case that the previous payment was pushed onto the DELAYQUEUE, which caused it to exceed its maximum size. Early in the day, this maximum size is the constant MAXDELAYQLENGTH, but, as of BEGINSHRINKQSECONDS simulated seconds after the beginning of the simulation, the maximum size shrinks proportionate to fraction of the simulated time interval that has elapsed since BEGINSHRINKQSECONDS. This is implemented via a WHILE loop with a complicated loop condition (i.e. loop continues only if condition is TRUE) equivalent to the following pseudo-code, using the variable mult that does not appear in the code:

IF delayqueue is empty
   THEN condition←FALSE
ELSE
  IF current time<time to begin shrinking delayqueue
    THEN mult←1
    ELSE IF current time>time to stop shrinking delayqueue
     then mult←0
    ELSE
     mult←fraction of period to shrink delay queue that has elapsed
  END IF
  IF delayqueue length>predetermined maximum * mult
    THEN condition←TRUE
    ELSE
     condition FALSE
  END IF
END IF The body of the loop involves the following steps:
1. decrementing the length of the delay queue.
2. popping the payment at the head of the delay queue and putting it on the large payment queue and the appropriate bilateral queue, ordered by payment size. Note that only large payments are placed on the delay queue in the first place.
3. If the size of the "popped" payment is sufficiently larger, then attempt to include it in a bilateral batch by calling MAKEBILATERALBATCH. "Large payments" are defined as 80% of the lower of the initial prefunded balance of the sending participant and receiving participant, but these payments must be at least 160% of the initial prefunded balance.

After all of the payments that need to be popped from the delay queue have been processed, the payment order just read can be processed. As was discussed above with reference to FIG. 3, payment orders may broadly be categorized as small, i.e., preferably less than 80% of the lesser initial prefunded balance requirement, and large, i.e, not small. However, the inventors have found that it is advantageous to further divide the category of "small" payment orders less than 80% of the flow cap so as to divide all payment orders into three categories: small, or "very small" (less than or equal to 20% of the initial prefunded balance requirement), medium (between 20% and 80% of the initial prefunded balance requirement), and large (greater than 80% of the initial prefunded balance requirement). Note that in this context medium is subcategory of the previously defined "small" category. In the model code, medium, that subcategory of small discussed above, and large payments are eligible to be used as helper payments for multilateral batching, and are inserted into the GROUPORDSENDQUEUE and the GROUPORDRECVQUEUE for that purpose. Medium and large payments are also inserted into the SYSLARGEQUEUE and the BILATORDQUEUE, where they can also be used for bilateral batching. If the payment is greater than the flow cap (i.e. it is a "large payment"), it is marked as such (the LARGEAMOUNT bit is set), and inserted into the DELAYQUEUE. Note that the LARGEFLAG is not set because the large payment will not be processed as a target payment until it is released from the DELAYQUEUE.

A. How Bilateral and Multilateral Batches are Made
  1. MAKEBILATERALBATCH, The Bilateral Batch Routine The task of MAKEBILATERALBATCH is to try to make a bilateral batch using the current payment, pointed to by LINK, and the "non-small" (that is, medium and large) payments on the BILATORDQUEUE. The check is made by following the links from the head of the BILATORDQUEUE to find LINK1, a payment in the opposite direction with the smallest SSN whose size is between half and twice the current payment. If no such payment is found, then the algorithm terminates without changing the MAKEBILATERALBATCH flag from its default value of FALSE. If a LINK1 is found, the amounts in LINK1 and LINK are netted, and the sender and receiver are reversed if the net payment would be in the other direction. The search is then repeated for a second payment on the queue that is between half and twice the net of LINK and LINK1, then for a third payment on the queue that can be netted with the results, etc. Whenever such a payment is found, control loops back to the label AGAIN for another try; when such a payment is not found, control proceeds to the label XIT.

After each netting pass, the payment to be netted must be removed from its queues and added to the pseudo-payment's PSEUDOQUEUE. For the first netting pass (HAVEPSEUDO=TRUE), a new PSEUDOQUEUE must be started. The first step in building this queue is to create PSEUDOLINK, a new link created via GETSYSLINK, and to set the appropriate entries in the payment area pointed to by PSEUDOLINK to indicate that this payment area is, in fact, the start of a bilateral batch. This involves:

1. Setting the BILATERALBATCH flag in the pseudo-payment to TRUE.
2. Initializing the PSEUDOHEAD and PSEUDOTAIL in the pseudo-payment to zero, a defensive measure, because never before used links are already initialized to zero, and FORGETSYSLINK re-initializes "reclaimed" links to zero.
3. Replace the current payment (at LINK) with PSEUDOLINK in the SYSLARGEMEDQUEUE. However, because PSEUDOLINK will contain the netted information, LINK needs to be retained for its sender, receiver, and amount information. Link is therefore removed from all queues via the REMOVE routine. This will ensure that the payment at LINK is unavailable to either the multilateral batch routines or the release routines. Because SSN is used to determine payment release priority, earliest first, and because the pseudo-payment's SSN will be the smallest SSN of the payments in its pseudo-queue, each such payment will have at least as much priority as before it was batched.

4. Add LINK to the PSEUDOQUEUE.

A subset of the above steps also need to be performed for subsequent payments to be included in the bilateral batch. If the SSN of the payment to be included is less than the current value of the SSN in PSEUDOLINK, PSEUDOLINK must take the place of LINK1 in the SYSLARGEQUEUE. LINK1 is then removed from the queues via the same kind of call to REMOVE as before. Otherwise, there is no need to keep LINK1 on any of the queues, so REMOVE is called with QFS=–0. In other words, REMOVE removes LINK1 from all queues, but with no call to FORGETSYSLINK. LINK1 is then added to the PSEUDOQUEUE via the PSEUDOINSERT DEFINE.

When the XIT label is finally reached, there is some cleanup work to do if there is a pseudo-payment (i.e. HAVEPSEUDO=TRUE). It is at this point, for example, that the sender, receiver. and amount of the pseudo-payment are set. Also, it is only at this point that the LARGEAMOUNT flag in the pseudo-payment can be set, because it is only at this point that the net amount is known. If the net amount is a large amount, then it is put into the BILATORDQUEUE via BILATORDINSERT; if it is not, it is put into the BILATMEDSMALLQUEUE via BILATMEDIUMPUSH. Note that the pseudo-payment cannot simply be INSERTed into the BILATMEDSMALLQUEUE because the pseudo-payment's SSN is almost certainly not the largest in the queue.

2. CHECKBATCHES, BATCHRELEASABLE, CHECKSENDPAYMT, And CHECKRECVPAYMT, The Multilateral Batch Routines a. CHECKBATCHES This routine attempts to release large payments by including them in a batch of payments that can be released simultaneously, setting the CHECKBATCHES flag to TRUE if it is successful and FALSE otherwise. Of course, only batches that satisfy the constraint that all participants involved in the batch do not exceed their maximum or minimum available balances after the batch is released are acceptable, by including it with an appropriate batch of other payment orders.

The batching process is most likely to succeed for a given large "target" payment where the sender's available balance is positive and the receiver's available balance is negative relative to the prefunded balances, and least likely to succeed in the opposite case. Accordingly, CHECKBATCHES is a pair of loops over two variables, STOG and RTOG that can only assume the values 0 and 1, corresponding to the possible values of the sign bits of GROUPMDLPOSITION (SGRP) and GROUPMDLPOSITION(RGRP), the respective positions of the sender and receiver. The loops begin with STOG=0 and RTOG=1, corresponding to the most favorable case (a sender in a credit position and a receiver in a debit position), followed by the intermediate cases (both sender and receiver in credit position, then both sender and receiver in debit positions), and concluding with the sender in a debit position and the receiver in a credit position.

Within each loop, all large payments (identified via the LARGEAMOUNT flag) in the SYSLARGEQUEUE successively become target payments. BATCHRELEASABLE, the routine that actually creates the batch, can fail either because it is unable to create a tree of payments rooted on the sender of the target payment, or because it is unable to create a tree of payments rooted on the receiver of the target payment, in such a way that all participants in the batch remain within their position limits. In the first case, the nominally boolean BATCHRELEASABLE flag is set to SFAIL, which is DEFINE'd to the bit string "10"; in the second case, the BATCHRELEASABLE flag is set to RFAIL, which is DEFINE'd to the bit string "100". In both cases, the least significant bit has a zero value, so that the test on RSLT :=BATCHRELEASABLE is FALSE. Previous failed attempts to create a sender's or receiver's batch with a particular participant as a target are recorded by setting that participant's bit in the SFAILAMTMASK and the RFAILAMTMASK, respectively. If such an attempt has been made, a participant's subsequent attempt to send or receive the same or larger amount will certainly fail. Hence, there is no attempt to make the batch if the amount to be sent or received exceeds the amounts of these failures, which are stored in the SFAILAMT and RFAILAMT arrays, respectively. In all other cases, BATCHRELEASABLE is called to identifier a multilateral batch, and it calls BATCHRELEASE to release the first batch found.

b. BATCHRELEASABLE

The goal of BATCHRELEASABLE is to populate the BATCHLINK array with nodes that contain a valid multilateral batch that includes the target payment. The first entry in the BATCHLINK array must always be the target payment; hence the assignment statement BATCHLINK[0] :=LARGELINK. The next several statements compute SMINPMTSZ, SMAXPMTSZ, RMINPMTSZ, RMAXPMTSZ, the sizes of respective minimum and maximum payments that need to be received by the sender and sent by the receiver of the target payment at LINK in order to satisfy the debit and credit limit constraints. These minima and maxima are needed in the calls to CHECK-SENDPAYMT and CHECKRECVPAYMJ, which also require, respectively, the sender and receiver of the current target payment.

c. CHECKSENDPAYMT And CHECKRECVPAYMT

Because the process of constructing a sender batch is essentially identical to that of constructing a receiver batch, only CHECKSENDPAYMT will be described in detail. The work of CHECKSENDPAYMT is best described by thinking of the sender batch as a tree with the sender of the target payment at the root, with payments to the sender as the first level branches, payments to the sender(s) on the first level as the second level branches, etc. Each recursive call to CHECKSENDPAYMT adds at most MAXBRANCHES leaf nodes above a single sender node until either the position constraints are met at the single sender node or the procedure exits with failure.

CHECKSENDPAYMT begins its work by checking whether it is already done. This possibility must be considered because payments as large as the minimum of the sender's and receiver's initial prefunded balance requirements, above the cutoff for a large payment, could conceivably be released without batching, depending on the sender's and receiver's available balances. This will be the case if the passed parameter SMINPMTSZ, the minimum contribution required from the sender tree, is less than or equal to zero.

CHECKSENDPAYMT then checks whether DEPTH>MAXDEPTH; if so, it must return false (failure) as the tree cannot be extended further.

If a non-null sender tree has to be built (i.e. SMINPMTSZ>0), CHECKSENDPAYMT first attempts to find a single payment that will work (PHASE 0), and, failing that, a series of payments that will work (PHASE 1). To find these payments, CHECKSENDPAYMT loops through the GROUPORDRECVQUEUE, until the payments become smaller than MINACCEPTABLE, to identify those payments to the sender of the target payment that satisfy the following conditions:

1. The payment has not yet been included in either the sender tree or the receiver tree (i.e. LINK is not found in the BATCHLINKS array).

2. CHECKSENDPAYMT has not yet encountered this participant in building this set of leaf nodes at this level (i.e. the local GRPMASK flag for this participant has not been set). Nor has this participant occurred below on the branch of the tree containing the current node.

3. The sender is in a position greater than or equal to its beginning-of-day position.

4. The payment amount is less than or equal to MAXACCEPTABLE. In PHASE 0, this is the largest payment size that would not violate the receiver's maximum available balance. When NOCREDITLIMITS=TRUE in this phase, and credit limits are lifted, MAXACCEPTABLE is set to $9 billion, a conveniently written amount that suitably large. In PHASE 1, MAXACCEPTABLE is set to SMINPMTSZ, which forces the program to find more than one payment to the target receiver, and so cause branching in the tree.

If all of these constraints are satisfied, then the payment order is a candidate for being included as a tree node. There may be more than one such candidate. If so, the one resulting in the smallest deficit below the trial payment sender's minimum available balance (i.e. smallest DNEXTMINPMTSZ) is marked as BESTLINK and the corresponding GRPDONE flag is set. If DBESTMINPMTSZ≦0, then this node need not have any children (and thus no additional payment orders need be added to the batch) because there is no deficit below the sender's minimum available balance. Otherwise, if the depth of the tree is not yet MAXDEPTH, a recursive call to CHECKSENDPAYMT needs to be made to identify these additional payment orders and include them as children of the current node.

To ensure that the sender of the candidate payment does not drop below its minimum available balance, we must have DNEXTPOS−DAMT≧DNEXTCAP, where DAMT, DNEXTCAP, and DNEXTPOS are, respectively, the amount of the candidate payment, the minimum available balance of its sender, and the position of the sender. The correctness of the computation DNEXTMINPMTSZ:=DAMT+DNEXTCAP−DNEXTPOS follows from the definition of DNEXTMINPMTSZ as the additional amount that needs to be sent to the sender to ensure that the inequality is true.

If DBESTMINPMTSZ≦0 or if the recursive call to CHECKSENDPAYMT returns TRUE, the candidate node, BESTLINK, is actually added to the tree via the QUEUE procedure. This procedure copies BESTLINK into the first empty array element in the BATCHLINK array, BATCHLINK [BATCHLINKS], as well as storing the sender, receiver, and amount of the corresponding payment in BATCHSGRP[BATCHLINKS], BATCHRGRP [BATCHLINKS], and DBATCHAMOUNT [BATCHLINKS], respectively. The QUEUE procedure returns control to CHECKSENDPAYMT, after incrementing BATCHLINKS to reflect the fact that the first empty array elements in the BATCHLINK, BATCHSGRP, BATCHRGRP, and DBATCHAMOUNT arrays are one larger than before.

What happens next depends on PHASE. Recall that, in PHASE 0, CHECKSENDPAYMT attempts to find a single payment that can be sent to the sender of the target payment to ensure that the available balances of both senders do not exceed their minimum available balance. After doing all of the above computations with PHASE=0, CHECKSENDPAYMT will either return TRUE if such a payment was found, or set PHASE=1 to allow CHECKSENDPAYMT to search for multiple payments to do the job. Each time a new branch is added to the tree during phase 1, the values of MAXACCEPTABLE and MINACCEPTABLE are recomputed. CHECKSENDPAYMT will either return TRUE if such a group of payments is found, or simply stop looking after MAXBRANCH payments are tried.

A nearly identical procedure is used to build the receiver tree in CHECKRECVPAYMT. Indeed, the only differences are the obvious ones: the GROUPORDSENDQUEUE is referenced in place of the GROUPORDRECVQUEUE; participants included in the receiver tree must be in a debit position; and the computation of DNEXTMINPMTSZ changes to DNEXTMINPMTSZ:=DAMT−DNEXTCAP+DNEXTPOS.

The constraint on the receiver arises from the need to remain within his maximum available balance, which corresponds to the condition DNEXTPOS+DAMT≦DNEXTCAP. Once more, if the receiver needs to receive a payment of DNEXTMINPMTSZ to make this inequality true, the computation in the text is the appropriate one.

Figure 4:
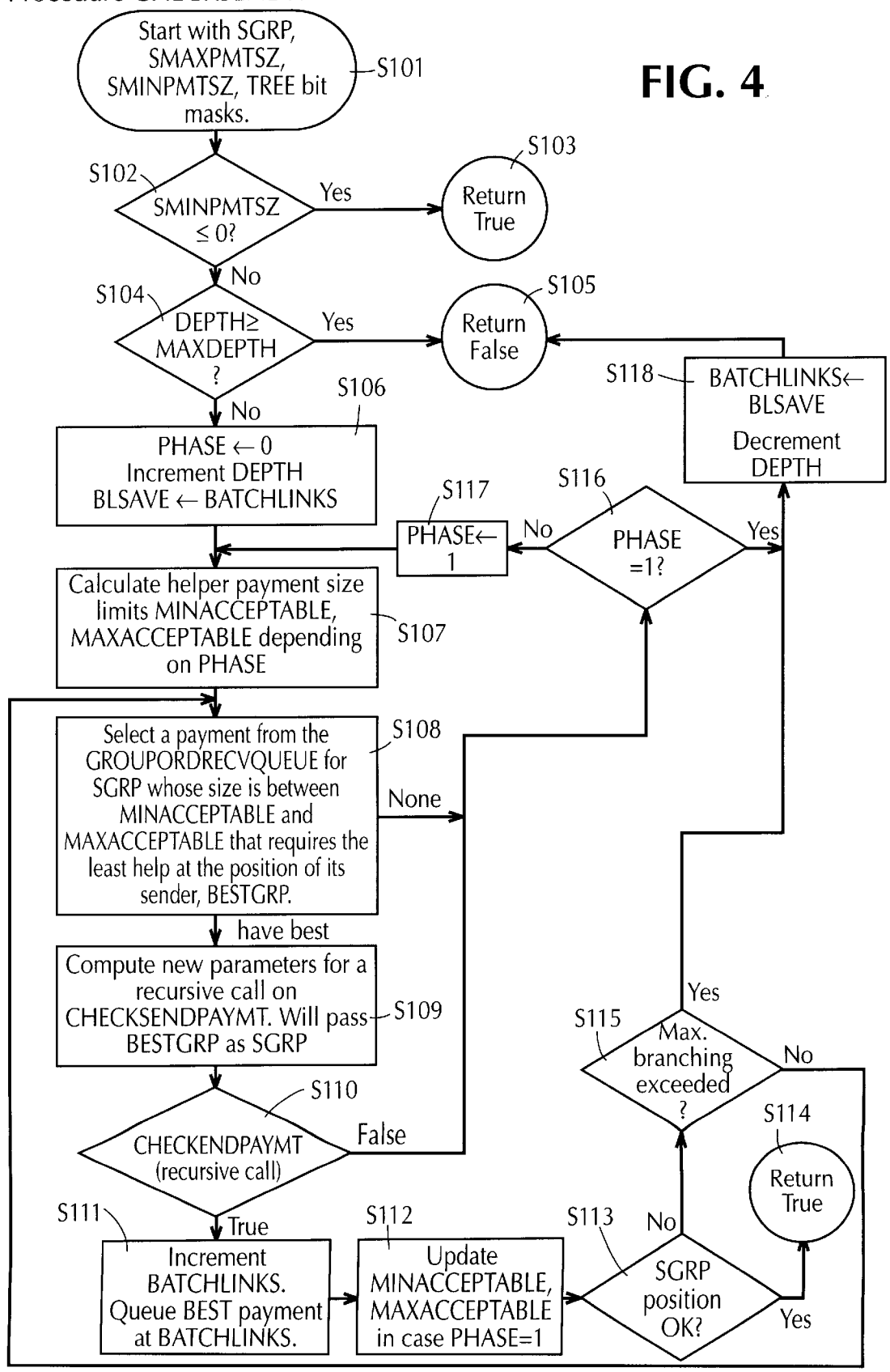
FIG. 4 is a flow chart illustrating the process flow of procedure CHECKSENDPAYMT.

FIG. 4 illustrates the basic flow of procedure CHECKSENDPAYMT. When a call to procedure CHECKSENDPAYMT returns true, a tree has been successfully been created. If the call returns false, the procedure has failed in its attempt to create a tree of payment orders.

As shown in the figure, upon calling the procedure, SGRP, SMAXPMTSZ, SMINPMTSZ, and TREE are passed in, at step S101, as passed parameters. SGRP is the participant number of the sending participant that represents the current end node at any particular point in tree construction. SMAXPMTSZ represents the largest size payment order that can, taking into account the available balance, be used as a helper payment to SGRP. SMINPMTSZ represents the smallest such payment order. TREE is a bitmask used internally to prevent a particular participant from appearing more than once on any particular branch of the tree. At step S102, it is determined if SMINPMTSZ is less than or equal to zero. If yes, at S103, the procedure is exited returning true. This is because, if SMINPMTSZ is less than zero, the tree has been completed and no further tree building is needed. If SMINPMTSZ is greater than zero, the flow continues to S104 at which it is determined if DEPTH is greater than or equal to MAXDEPTH. DEPTH equals the depth of recursion as well as the length of the longest branch of the tree. MAXDEPTH is a predetermined constant. If the answer is yes, the procedure exits returning false. If the answer is no, the flow continues to step 106, at which PHASE is set to be 0, DEPTH is incremented and BLSAVE is assigned the value of BATCHLINKS. PHASE can have a value of zero or one. A current value of zero indicates that an attempt is being made to find a single helper payment order. If the value is one, the procedure is attempting to find a list of progressively smaller helper payments that will cause branching on the tree. The flow then proceeds to step S107, at which payment size limits MINACCEPTABLE, and MAXACEPTABLE are calculated depending upon phase. Next, at step S108, a payment is selected from the GROUPORDRECV QUEUE for SGRP whose size is between MINACCEPTABLE and MAXACCEPTABLE that requires the least help at the position of its sender, BESTGRP.

If no such payment can be found, the flow proceeds from step S108 to step S116, at which it is determined if PHASE equals one. If PHASE does not equal one, then at step S117, PHASE is set to one and the flow loops back to enter step S107, discussed above. If, on the other hand, PHASE is found at step S116 to equal one, the flow proceeds to step S118, at which BATCHLINKS gets the value of BLSAVE and DEPTH is decremented, and the procedure is exited with a false result.

If, at step S108 a payment can be found, then at step S109, new parameters are computed for a recursive call to CHECKSENDPAYMT, with BESTGRP being passed in as parameter SGRP. Also, in the recursive call, MINACCEPTABLE is passed in as parameter SMINPMTSZ and MAXACCEPTABLE is passed in as SMAXPMTSZ. Next, at step S110, the recursive call of CHECKSENDPAYMT is executed. If the recursive call of CHECKSENDPAYMT returns false, the process flow proceeds to step S116, described previously. If the recursive call returns true, the flow proceeds to step S111. At step S111, BATCHLINKS is incremented and the BEST payment is queued at array BATCHLINK[BATCHLINKS]. BATCHLINK is an array containing links to the tentative payments in the tree. Next, at step S112, MINACCEPTABLE and MAXACCEPTABLE are updated in the case where PHASE equals one. Then, at step S113, it is determined whether SGRP'S available balance is acceptable. If so, then the procedure CHECKSENDPAYMT exits returning true. If not, the flow proceeds to step S115, at which it is determined whether maximum branching has been exceeded. If not, the process loops back to step S108. If so, the process flow proceeds to step S118, described previously, and the procedure exits returning false.

B. How Payments are Released

For the purposes of the simulation, the "release" of a payment is simply the subtraction of the amount of the payment from the sender's available balance and adding the corresponding amount to the receiver's available balance, a task that is performed in the RELEASE procedure (Note that this procedure is not shown in the pseudo-code above; however, it is called by some of the routines that are listed there. See below for details.).

A payment is passed to the RELEASE procedure in one of several ways, depending on whether it is part of a multilateral batch, a bilateral batch, or an individual small payment. Payments that are part of a multilateral batch are sent to RELEASE via BATCHRELEASE, which is called in CHECKBATCHES. Since CHECKBATCHES is the routine that supervises the construction of multilateral batches, BATCHRELEASE is called as soon as the multilateral batch is constructed. BATCHRELEASE is coded so that a single multilateral batch is released as a unit.

Small payments and small bilateral batched payments are both processed via TRYTORELEASE. A central feature of this release mode is the attempt, using the routine GALESHAPLEY, to identify a batch of small payments that can be released simultaneously. Once these payments are known, the RELEASELOOP routine is called to actually do the call to RELEASE.

Each of these release mechanisms uses the MASKLOOP DEFINE to determine which participants have potentially releasable payments. MASKLOOP is called with the parameters MASK, GRP, and LOOPX. MASK is a multi-word bit mask whose bits are set to TRUE if the corresponding participant (or "group") has a potentially releasable payment. GRP is an integer between 1 and GROUPSFOUND, the number of groups, and LOOPX is a workspace that is initially set to zero. Each time MASKLOOP is called, GRP is initially set to FIRSTONE(REAL(MASK[LOOPX]))−1. If the least significant bit of MASK[LOOPX] is bit 1, the next most significant bit is bit 2, etc., the built-in function FIRSTONE returns the bit number of the most significant bit of MASK[LOOPX] (e.g. 1 plus the base 2 log of MASK[LOOPX]) or zero if MASK[LOOPX]=0. If MASK[LOOPX]=0, LOOPX is incremented by one, so that the next word of the mask can be searched for "1" bits. Otherwise (i.e. MASK[LOOPX]≠0), the most significant bit of MASK[LOOPX] is set to zero, 48*LOOPX is added to GRP to take into account the position of the word currently being searched, and control is returned to the calling procedure.

1. BATCHRELEASE

BATCHRELEASE, which releases multilateral batches, is the most straightforward of the release mechanisms—it is simply a loop over each of the entries in the BATCHLINK array. These entries contain the payments to be released, as well as a flag indicating whether the payment is actually part of a pseudo-payment. Thus, the loop invokes RELEASE for each payment, after which the node storing the payment is deleted from the system by calling REMOVE with the argument "0" (Recall that this argument is a mask that prevents the node from being removed from the indicated queues. "0" means "remove this node from all queues".).

When incorporated in CHIPS, BATCHRELEASE will cause the release of all payments in the batch in a single transaction.

2. TRYTORELEASE

TRYTORELEASE, which releases small payments and small pseudo-payments, makes calls to GALESHAPLEY with the correct GROUPBIDDERMASK and GROUPBIDDEEMASK, the flags indicating which participants are bidders and biddee's. Because GALESHAPLEY's running time increases at least quadratically with the number of bidders and biddee's, it is important to make sure that the number of each is as small as possible. In particular, when senders are bidders, only participants with a payment to send (GROUPSENDQNOTNULL flag is TRUE for that participant) should be allowed to bid. Perhaps less obvious is that only those participants whose situation has possibly changed, as a result of a newly arrived payment order or as the result of a released payment, need to be involved in the bidding.

TRYTORELEASE calls GALESHAPLEY twice, once with senders as bidders (i.e. with the passed parameter SENDERBIDS=TRUE), and once with receivers as bidders (i.e. with the passed parameter SENDERBIDS=FALSE). In both cases, GALESHAPLEY is called only if the number of bidders (BIDDERCOUNT1 when senders bid and BIDDERCOUNT2 when receivers bid) is greater than zero. In the first call, participants whose status has changed such that they might now be able to send an additional payment (i.e. that participant's SENDERSTATE flag is TRUE) are bidders. Thus, TRYTORELEASE calls MASKAND to compute GROUPBIDDERMASK, the set of flags indicating which participants are bidders, as

GROUPBIDDERMASK SENDERSTATE & GROUPSENDQNOTNULL.

BIDDERCOUNT1 is then computed in the procedure call COUNTBITS(GROUPBIDDERMASK, BIDDERCOUNT1, TEMP).

The first call to GALESHAPLEY is made with this set of GROUPBIDDERMASK flags and a set of GROUPBIDDEEMASK flags that are copies of the current GROUPRECVQNOTNULL flags. The second call to GALESHAPLEY is made with GROUPBIDDERMASK←RECEIVERSTATE & GROUPRECVQNOTNULL.

but only if BIDDERCOUNT2, computed in

COUNTBITS(GROUPBIDDERMASK, BIDDERCOUNT2, TEMP), is positive.

The output of GALESHAPLEY is the pair of integer arrays, GROUPSENDSTO and GROUPRECEIVESFROM. The $i^{th}$. entry of GROUPSENDSTO is the participant ("group") number of the (unique) receiver of the payment that j has to send; similarly, the $j^{th}$ entry of GROUPRECEIVESFROM is the participant ("group") number of the (unique) sender of the payment that j is to receive. As will be explained below in more detail, this is the mechanism by which RELEASELOOP, which is called immediately after GALESHAPLEY is able to determine which payments are to be sent to RELEASE.

For the call to GALESHAPLEY in which receivers are bidders, participants whose status has changed such that they might now be able to receive an additional payment (i.e., that participant's RECEIVERSTATE flag is TRUE) are bidders. Thus, TRYTORELEASE calls MASKAND to compute GROUPBIDDERMASK, the set of flags indicating which participants are bidders, as

GROUPBIDDERMASK←RECEIVERSTATE & GROUPRECVQNOTNULL.

The GROUPBIDDEEMASK flags that are used are copies of the current GROUPSENDQNOTNULL flags. Once more, RELEASELOOP is then called to actually release the payments.

TRYTORELEASE returns a flag of the same name that is true if and only if there are no participants that bid to send payments in the first call to GALESHAPLEY and no participants that bid to receive payments in the second call to GALESHAPLEY. Symbolically, this is

TRYTORELEASE←(BIDDERCOUNT1=0) AND (BIDDERCOUNT2=0)

As is clear from the pseudo-code detailed above, when TRYTORELEASE returns TRUE, the loop in which TRYTORELEASE is called is terminated.

3. GALESHAPLEY

As was described above, this routine attempts to pair senders and receivers of payments in a kind of generalized FIFO queue discipline. Thus, for each bidder, "Bidders" are those participants who are so indicated by a TRUE value of the GROUPBIDDERMASK. Bidders submit bids until no more bids are rejected (REJECTCOUNT=0), at which point every bidder has been uniquely associated with a single payment.

The beginning of each round of bidding involves the identification of that payment with the earliest time stamp (SSN) that is associated with the bidder (Note that SSN's which are used in this calculation are unique, thus eliminating the possibility of "ties."). This involves two nested DO UNTIL loops, one over the bidders, and one over the biddees. The outer loop uses the MASKLOOP DEFINE on GROUPREJECTMASK, a copy of GROUPBIDDERMASK, to restrict processing to actual bidders. For each such bidder, the MASKLOOP DEFINE stores either the (positive) participant ID number in GRPA or the value −1. The inner loop uses the MASKLOOP DEFINE on GROUPBIDDEEMASK3, a copy of GROUPBIDDEEMASK, to determine which of the potential biddees is associated with the payment with the earliest time stamp. For each such biddee, the MASKLOOP DEFINE stores either the (positive) participant ID number in GRPB1 or the value −1.

A bid for a payment is valid only if the payment satisfies all of the funding constraints. Checking these is somewhat more involved than in, say, CHECKSENDPAYMT, because part of the computation can be done in the outer loop and which part is done depends on whether senders or receivers are bidding. Nevertheless, the calculation has been described above, it is noted only that the flag FITTOG is set to TRUE if the constraints are satisfied and FALSE otherwise. It is only if FITTOG is TRUE that the comparison is made between the earliest time stamp found thus far, SAVESSN, and the SSN of the payment involving GRPA and GRPB1. If this latter payment has the earlier time stamp, the contents of GRPB1 are copied to GRPB, and SAVESSN is updated with the earlier time stamp just found. At the end of the inner loop, then SAVESSN will have the earliest of the time stamps found this way and the pair GRPA and GRPB will have the sender and receiver of the corresponding payment. If SENDERBIDS=TRUE, GRPA and GRPB will be the respective sender and receiver of the payment; otherwise, GRPB will be the sender and GRPA will be the receiver.

A bid is accepted if it is the first bid for the biddee (i.e. GROUPRECEIVESFROM(GRPB) IS 0 if SENDERBIDS=TRUE or GROUPSENDSTO(GRPB) IS 0 if SENDERBIDS=FALSE) or the bid refers to an earlier time stamp than the previous accepted bid (i.e. if SENDERBIDS=TRUE, SSN(BILATMEDIUMHEAD(GRPA, GRPB), PMT) <SSN(BILATMEDIUMHEAD(GROUPRECEIVESFROM (GRPB), GRPB), PMT)

and

SSN(BILATMEDIUMHEAD(GRPB, GRPA), PMT) <SSN(BILATMEDIUMHEAD(GRPB, GROUPSENDSTO (GRPB), PMT)

if SENDERBIDS=FALSE).

The accepted bids are entered using the two DEFINES, TENTATIVEDATEA and TENTATIVEDATEB, that cover the cases SENDERBIDS=TRUE and SENDERBIDS=FALSE, respectively. Focus will now only be on TENTATIVEDATEA; TENTATIVEDATEB works the same way, but adjusted for the fact that receivers are the bidders when it is invoked. If the bid is not the first for the biddee, GRPB, (i.e. REJECT=TRUE), TENTATIVEDATEA contains the code required to enable the rejected bidder to bid again. First, the rejected bidder (which must be other than GRPA) is computed to be GROUPRECEIVESFROM(GRPB), and, since this bidder is a sender, the corresponding GROUPSENDSTO entry is set to 0. To make sure that this sender can bid again, the GROUPREJECTMASK2 flag for that sender is set to TRUE (See below for the implications of this). Finally, REJECTCOUNT, the count of rejected bids, is incremented. Regardless of whether the previous bid has been rejected, TENTATIVEDATEA sets the array entries GROUPRECEIVESFROM(GRPA), the receiver of the payment sent by GRPA, and GROUPSENDSTO (GRPB), the sender of the payment received by GRPB, to GRPB and GRPA, respectively.

Among the last instructions in the main (REJECTCOUNT=0) loop is

MOVEMASK(GROUPREJECTMASK2, GROUPREJECTMASK).

This instruction copies GROUPREJECTMASK2 to GROUPREJECTMASK which prepares for the next pass through the loop. Recall that only the bits corresponding to rejected bidders in GROUPREJECTMASK2 are set to TRUE. Thus, each pass through the main loop after the first will involve only those senders whose bids were rejected on the previous pass.

Figure 5:
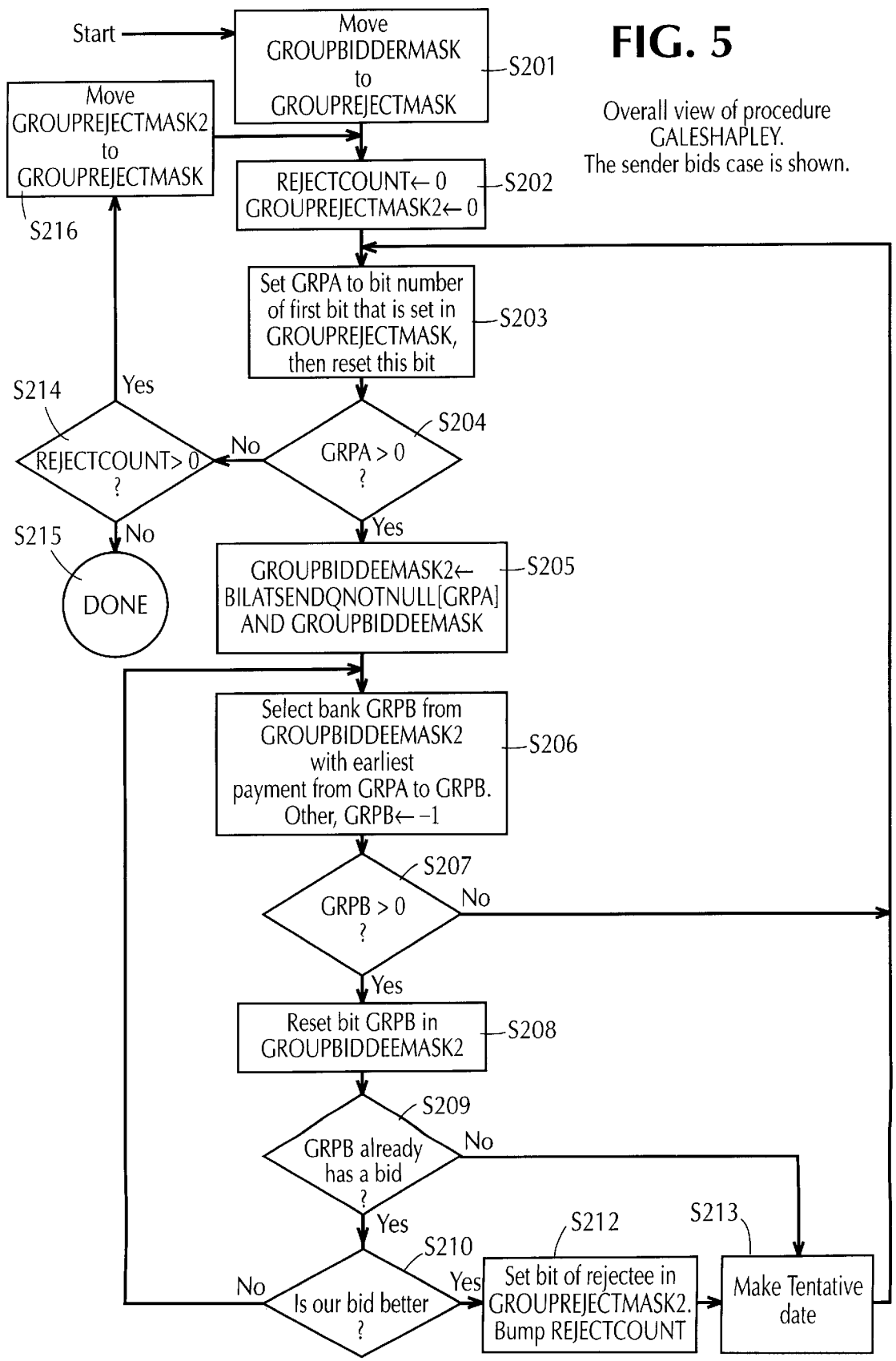
FIG. 5 is a flow chart illustrating the process flow of procedure GALESHAPLY.

FIG. 5 illustrates the overall process flow of procedure GALESHAPLEY, which is used to optimize release of small payments without batching. At step S201, GROUPBIDDERMASK is moved to GROUPREJECTMASK. GROUPBIDDERMASK is a mask set by procedure TYRTORELEASE, discussed elsewhere, that contains a bit for each participant that will act as a bidder in the current call of procedure GALESHAPLEY. GROUPREJECTMASK is a mask containing a bit for all participants that have not been accepted. As the execution of the procedure begins, none of the participants have been accepted. Therefore, all of the bidder participants are placed in GROUPREJECTMASK, to be removed later as they are accepted. Then, at step S202, REJECTCOUNT, a count of how many bidders are rejected in a particular pass through the loop, and GROUPREJECTMASK2, a mask containing such rejected bidders, each are set to zero. In step S203, GRPA, a bidding participant currently under consideration, is set to the bit number of the first bit that is set in GROUPREJECTMASK, in other words, a first bidder is selected. Then, this bit is reset so that this bidder will not be selected on subsequent pass through S203. At step S204, a determination is made whether GRPA is greater than zero, that is, whether a bidder was found (were any bits set in GROUPREJECTMASK). If no, the process flow proceeds to step S214, where a determination is made whether REJECTCOUNT is greater than zero. If no, the procedure is done and exits. If yes, then at step S216 GROUPREJECTMASK2 is moved to GROUPREJECTMASK and the flow loops to step S202.

Once a bidder has been found, it must be determined what the bidder will bid on. The procedure needs to find a receiving participant that has a payment in its bilateral queue sent to them by GRPA. Thus, if it is determined that GRPA is greater than zero, then GROUPBIDDEEMASK2, a mask to indicate candidate biddees in the current pass of the loop, gets BILATSENDQNOTNULL[GRPA] AND GROUPBIDDEEMASK. That is, GROUPBIDDEEMASK2 is assigned the logical AND of flag BILATSENDQNOTNULL[GRPA], which is a flag indicating, if true, that there is a payment order in the bilateral queue between GRPA and the biddee, and GROUPBIDDEEMASK, the mask having been previously set at procedure TRYTORELEASE that contains the candidate biddees for this call of GALESHAPLEY. The process flow then proceeds to step S206, at which a participant GRPB is selected from GROUPBIDDEEMASK2 that has the earliest payment from GRPA to GRPB. If one cannot be found, GRPB is assigned −1. Next, at step S207 it is determined if GRPB is greater than zero, which would indicate that a biddee has been found. If it is not greater than zero, the flow loops back to re-enter at step S203.

If GRPB is greater than zero, then at step S208 bit GRPB in GROUPBIDDEEMASK2 is reset so that the biddee will not be used again. At step S209 it is determined whether GRPB already has a bid. If no, the flow proceeds to step S213 at which a tentative match, or "date" is made and the flow then loops back to re-enter at step S203. If GRPB already has a bid, then, at step S210, it is determined if our bid, i.e., the bid currently under consideration, is better. If yes, the flow proceeds to step S212 at which the bit of the rejectee is set in GROUPREJECTMASK2, and REJECTCOUNT is bumped (incremented) and then the process flow proceeds to step S213, described above. If our bid is not better, then the process flow loops and re-enters at step S206.

4. RELEASELOOP

By the time this procedure is called, the "near disjoint" batch of small payments to be released as been identified, and it is the task of this procedure to send them to the RELEASE procedure. RELEASELOOP gets its name from the loop over the participants flagged as senders or receivers in GROUPBIDDERMASK. The loop is implemented using the MASKLOOP DEFINE, which assigns the ID of each such participant to the variable GRPA. Since it is not clear whether such a participant is either a sender or receiver, first GROUPSENDSTO(GRPA) and then GROUPRECEIVESFROM(GRPA) are checked to see if they contain positive values. If GROUPSENDSTO(GRPA) has a positive value, then the Gale-Shapley algorithm guarantees that there must be a payment with GROUPSENDSTO(GRPA) as sender and GRPA as receiver; similarly if GROUPRECEIVESFROM(GRPA) has a positive value then there must be a payment with GRPA as sender and GROUPRECEIVESFROM(GRPA) as receiver. Because it must be the payment between these two participants with the earliest time stamp, it must be that payment node to which the corresponding BILATMEDIUMHEAD pointer points.

After this payment is released via a call to RELEASE, the call

REMOVE(LINK, 0)

removes the corresponding node from all queues. The POSITIONCHECK routine is then called for both the sender and receiver, to make sure that they remain within their pre-funded limits. Finally, the appropriate entries in the GROUPRECEIVESFROM and GROUPSENDSTO arrays are reset to zero, which is an invalid participant ID.

X. RECAP OF SYSTEM FEATURES

In recap, some of the important features of the present invention are:

(1) Payments are stored and queued in the system by the sending participants. Release to the receiving participant occurs subsequently as permitted by the available balances within the system and the ability of the system to form suitable batches of large payments.

(2) The available balances of each participant are limited below by zero (the "minimum available balance") and above by the maximum available balance. The maximum available balance limitation is an important feature of the design which helps to make efficient operation possible.

The use of maximum available balances increases the percentage of queued payments that are releasable at a given instant of time. It is important to maximize this percentage both to attain efficient system operation and to permit criteria other than mere releasability to govern the order in which payments are released. Importantly, it is desirable to give priority to those payments that have been queued longest; and it is desirable that this priority should have as much effect as possible.

Both a priori considerations and experimentation have established that the symmetry of equal differences between the prefunding amount and the minimum and maximum available balances represents a near optimum situation.

(3) Payments entered into the system are classified immediately by size into two broad categories. Small payments are those for which no batching will be attempted. Large payments are those that normally must be batched with other payments in order to be released.

Both processes proceed continuously; there is no minimum time interval between releases of either type. The classification by size is done by a formula that involves the beginning-of-day funding balances of the sender and the receiver of the payment.

(4) As an aid to efficient operation, small payments are entered into bilateral queues. There is a distinct bilateral queue for each sender-receiver pair. This helps to make it possible to find releasable payments at a given instant of time with a minimum of trial-and-error. It also provides a FIFO discipline on the release of small payments.

(5) Efficient operation is also promoted by the use of bit masks, within which each financial institution is assigned one bit position relative to its prefunding amount. Two such masks that are used are (a) a mask to indicate which queues are non-empty; and (b) a mask showing which banks have had payments queued recently or have had their positions altered recently so that they may again be in a position to send or receive a payment.

(6) A feature has been incorporated that considers the interests of payment receivers as well as payment senders in deciding which payments to send next. The algorithm is based on the method of Gale and Shapley.

(7) A method of bilateral batching is used that may combine two payments queued for transmission in opposite directions into one pseudo-payment batch if the two original payments have dollar sizes that differ by no more that 2:1. A result of this size restriction is that the resulting pseudo-payment, whose size is the difference of the sizes of the two original payments, has a size no larger than the smaller of the two original payments. The resulting pseudo-payment may then itself be combined with another payment or pseudo-payment, repetitively.

By limiting bilateral batching to the combining of payments that do not differ much in size, the technique is better able to accommodate a wide variety of payment size distributions.

Another way of considering this rule is that it prevents premature batching of badly matched payments by imposing a threshold rule on bilateral batching.

(8) A new method of multilateral batching is employed. A tree of payments is constructed among the banks in a credit position to aid the sending bank in sending a designated large payment without exceeding its debit cap (zero). A second tree of payments is constructed among banks in a debit position to aid the receiving bank in accepting the designated large payment without exceeding its maximum available balance.

This division of the banks into two disjoint classes while constructing the trees is a major factor in the success of the technique.

(9) In constructing the trees mentioned above, at each stage of the construction priority is given to the use of a single branch (payment) leading from a given node (bank). This tends to result in the use of "helper" payments whose size is closest to that of the payment aided. Such a strategy makes the system less sensitive to variations in the distribution of payment sizes within the system than it would be otherwise.

(10) Target payment sender and receiver may be in the wrong positions. That is, the sending participant may be in a debit position and/or the receiving bank may be in a credit position relative to its prefunding amount. However, priority is given to the construction of batches where such mismatches do not occur or are minimized. These exceptional situations are allowed so that the primary goal of minimized payment delays is addressed; the system does not necessarily wait until the position signs of the sender and receiver are the preferred ones.

(12) In constructing the trees of payments within a multilateral batch, the same bank may not occur twice on same branch. However, the same bank is permitted to occur more than once in the tree. Though it may be difficult to predict that permitting this will be beneficial, it has been found empirically to increase total throughput.

(13) A delay queue for large payments is employed. While in the delay queue, large payments may be used as helper payments in multilateral and bilateral batching. The net effect of this is to provide more helper payments; this increases throughput and system efficiency, while increasing the delays experienced somewhat.

(14) A number of somewhat arbitrary parameters are used to help define system operation. These are tuned experimentally to achieve maximum throughput or some other design goal.

(15) A simple convention permits clearing the payments left queued at end of day. The convention is consistent with the principle that no payment will be released until it is finally settled between the sending and receiving participants. The procedure is to perform a settlement, at end-of-day, of the queued unreleased payments only. Operationally, this proceeds as any clearing-house settlement.CHIPS will calculate a multilateral net balance for all participants based on the payment messages that remain in storage without actually releasing any of those payment messages. This net balance will be applied to each participant's available balance. If the result for a participant is a negative number, then the participant has a final prefunded balance requirement; if the result for a participant is positive, the participant has a final prefunded balance entitlement. A participant that has a final prefunded balance requirement will pay that amount by sending a Fedwire payment order to the prefunded balance account. Once all of the required Fedwires have been received, CHIPS will send Fedwires to the other participants in the amount of their final prefunded balance entitlements.

(16) Efficient operation of this system requires that each different strategy employed, bilateral queuing for small payments, bilateral batching, multilateral batching target payments, and multilateral batching helper payments must be reflected in the form of the data structures used in the system. For this reason, multiple linking must exist within the queued payment records. Each distinct set of links within the queued payment serves to give the payment a position within a particular queue. Each distinct queue is designed to implement one particular function used to batch or release payments.

(17) To ensure the robustness and reliability of the system through successive refinements it is advisable to leave certain integrity checks in place at all times. One of these is a position check. After a release or batch release is performed, a check is made that the maximum and minimum available balance of all banks involved in the batch remain within the prescribed limits.

(18) In the initial implementation of this system, all queues are implemented as double linked lists. Some of these queues require an ordered insert to be performed. This is an inefficient operation for long queues. For that reason, a system parameter (see (14) above) has been used to restrict some queues to contain payments only above a certain size.

In a variation of this system. B-trees might be used for such queues that require an ordered insert.

(19) To clarify a point, a single large payment may be released as a multilateral batch of one payment. Thus, multilateral batches may have any size, theoretically.

(20) In order to function as a continuing system, there must be a way to decide each participant's initial prefunded balance requirement. The only data available from which to compute such figures in an objective way is historical payment data. Thus it is essential to develop such a formula or formulas to be approved for such use.

XI. MODEL TECHNIQUE FOR SYSTEM WITH RELEASE FINALITY

A. Introduction

As has been described above, the system achieves finality of all releases. In the following explanation, Section B discusses operational aspects. Section C is a technical discussion concerned with automated release. Section D goes more deeply into the operation of the model code.

B. Operational Aspects.

In a preferred embodiment of the present invention, when the present invention is implemented using CHIPS, finality is achieved by the end-of-day netting of all payment messages that have been sent through CHIPS during the day and the settlement of resulting balances through a settlement account on the books of the Federal Reserve Bank of New York. The possibility of the failure of a debtor participant to pay its settlement obligation is dealt with by requiring all participants to enter into a loss-sharing agreement by which the surviving participants will share the losses resulting from another participant's failure. This obligation is secured by funds pledged by the participants and maintained in the CHIPS Prefunding Account at FRBNY. An advantage of the present invention is that it achieves intraday finality for payment messages as they are released while requiring the participants to post prefunded balances that are not significantly greater than the collateral that they post under the current CHIPS system. In effect, this means that the participants will have what are the equivalent of debit caps that are substantially lower than the debit caps that they work with under the current CHIPS system. To achieve this advantageous result, three main principles are brought to bear:

(1) Using store followed by automated release to change the order in which payments are released in such a way that small caps suffice to clear most payments.

(2) Batching large payments with other payments when necessary, producing a batch net amount that can be released in one step. The system is not limited to bilateral batching, unlike EAF-2.

(3) Payments not released before cutoff could be released following cutoff, provided that the additional required funds are provided first.

Features to be implemented include at least the following:

Payment messages that cause a Store and Queue operation.

New inquiry messages would be provided to allow participants to see what their position is relating to the queued unreleased payments.

Bilateral limit functions, such as those currently in use in CHIPS, would not be needed.

While for smaller (unbatched) payments with given sender and receiver, FIFO protocol would still determine payment release order, in general the exact release order would depend on the particular choices made by the system in forming batches.

C. Automated Release and Other Technical Issues

1. Overview

An aspect of the system that departs from past practice is the use of credit caps in addition to the debit caps. Since finality is guaranteed by the collateralized debit caps, one may well ask what the credit caps are for. In fact, they have no purpose related to risk avoidance. They help to provide a natural way to force payments to be released in an order that will keep the system positions from getting stuck at the debit caps so that nothing can be released. We assign a maximum available balance to each participant's available balance equal to twice that participant's prefunded balance.

2. Sketch of the Release Program: Small Payments

Release proceeds differently for payments in different dollar size classes. A "flow cap", arbitrarily defined as 0.8 times the debit cap, is used to distinguish small from large payments; those smaller than the flow cap are small, others are large.

Small payments are released individually (without batching) from bilateral FIFO queues as the positions of the sending and receiving participants permit. Neither debit limits nor credit limits may be exceeded following the release of a payment. Priority is always given to the release of the earliest queued payments. However, since "earliest" has different meanings for sender and receiver, a matching algorithm, the Gale-Shapley algorithm, is used to find an optimum match of senders with receivers that is in some sense best possible for both senders and receivers.

Large payments are released with the aid of multilateral and/or bilateral batching. Bilateral Batching will now be described.

Large queued payments are batched bilaterally as follows. When a large payment order from bank A to bank B is queued, a check is made to see whether there is another payment order from bank B to bank A already queued that is between half as large and twice as large as the first payment order. If so, such a second payment order is chosen and is batched with the first one. The result is a "pseudo-payment" whose amount is the difference of the amounts of the original two payment orders. Notice that this difference will be less than or equal to each of the amounts of the two payment orders in the batch. The direction of the pseudo-payment is the direction of the larger payment order.

After the pseudo-payment is formed, the process is repeated iteratively until no suitable "second" payment order is available. At each step, the size of the pseudo-payment gets smaller or, at worst, remains the same. Thus, the overall effect of bilateral batching is to reduce the size and number of the payments to be released. These pseudo-payments are then released either as small payments as described above, or as large payments, using multilateral batching, described next.

When the system "releases" a pseudo-payment, it releases all of the batched payments linked into the pseudo-payment in one transaction.

3. Multilateral Batching

The purpose of multilateral batching is to provide a means to release payments (and pseudo-payments) larger than the flow cap; indeed, even payments much larger than the debit and credit caps.

When a large payment is queued, after any bilateral batching has been done, a check is begun to see whether any large payments can now be released. Large payments from any one participant are considered oldest first.

When considering the release of a given large payment P from A to B, usually such a release would lower the position of A below its minimum available balance, and might also raise the position of B beyond its maximum available balance. Therefore helper payments to A from third party participants currently in a credit position are used to produce a net position at A that is-within the prescribed limits. Helper payments are chosen initially with only the position at A in mind.

At each stage of the construction, we have a tree of payments directed downwards toward the root participant A.

Participants at nodes of the tree with both incoming and outgoing branches satisfy their limit constraints. Leaf (terminal) nodes of the tree are participants that may exceed their debit cap, and which therefore may themselves need helper payments. Any participant in the tree that needs help of this sort is later either supplied with the help or is discarded, cutting back the tree.

If the construction succeeds, we obtain a tree of payments among the participants previously in a credit position such that every participant position in the tree, including participant A, is within its prescribed debit and credit limits.

If the system succeeds at constructing this tree of payments, it then tries to accomplish the analogous situation at B using payments from B to participants previously in a debit position. Another tree is constructed, if possible, so that every participant position in the second tree is within limits.

If all of this is accomplished successfully, all of the payments taken together constitute a multilateral batch and are released in a single transaction.

D. Model Code Narrative.

The Model used for simulation of the system of the present invention is a Unisys Algol program. As was described above, its input files consist of a few of offline files generated by CHIPS after the conclusion of a day's work. The principal input file is the RELEASEDATA file whose records contain a small amount of extracted data from each payment released over CHIPS that day. This data includes sending bank and receiving bank numbers, release time and money amount.

Another file used by the program is a file that gives the bilateral limits in effect that day. The reason for this file is that from these limits the program is able to compute a conservative estimate of the amount of collateral on deposit by each bank that day. These collateral amounts are used as debit cap amounts by the model. A primary goal of the modelling exercise was to see how much of a day's work could be released using these greatly reduced debit caps.

The program sorts the RELEASEDATA file into release time order, then reads this sorted file to simulate the receipt of payments from the participant banks during a working day.

The output of the program is a lengthy summary report giving details concerning which payments were released by the model and the delays experienced, and which payments were not released.

In the Algol programming language, declarations precede usage. Thus the declarations needed later appear near the beginning of the program. Likewise, the outer block of the program occurs at the end of the listing. There one may find the driving logic used.

The layout of the queued payments given by defines show what is stored relative to each queued payment. The first three words contain fields from the RELEASEDATA record as well as a sequence number SSN that indicates the order in which the payment was read, and two special purpose fields QFLAGS and LARGEAMOUNT, discussed later.

There are many sets of links within each payment. They come in pairs, forward and backward, required by several doubly-linked lists. SYSLINK is used to link payments from all banks into a single list. This makes it possible to easily find the oldest unreleased payments.

The GROUPORD links are used by lists that are distinct for each bank (also called "group" within CHIPS). These lists are ordered by payment dollar size, and contain only the larger payments. They are used in multilateral batching to find payments of particular sizes from or to particular banks, to be used as helper payments in the tree building.

Pseudohead and pseudotail are used in bilateral batching to link payments to "pseudo-payments". These pseudo-payments are treated much like real payments by the multilateral batching code.

The BILATORDLINK is used in selecting the payments to be placed into bilateral batches.

The BILATLINK is used in linking small payments with a given sender and receiver in FIFO order for release in this order.

The defines used for the ordered insert constructs are straightforward. They use merely sequential linking, not B-trees or other such sophisticated methods. The reason that this suffices, yielding adequate efficiency, is that only "larger" payments are kept in the ordered queues, and there are not too many of these queued at any one time.

1. Outer Block

Looking at the end of the program, notice the test for the presence of a TRAN file. Either a TRAN file or a RELEASEDATA file for a given date may be used. A TRAN file will be used if available for the date specified in the run parameter. Otherwise the much smaller RELEASDATA file will be looked for. Other files needed are the current limit file, mentioned before, and the MINIG file. This last small file merely gives the correspondence between the CHIPS four-digit ABA numbers assigned to participants and the sequential Relative Group Number, also called GRP or RGN.

Looking at the outer block at "main loop", we see that the main loop is driven by reading the sorted file of releases. A sort is performed at initialization that produces a file of releases in order of release time. If the TRAN file is used, this file also contains the actual SSN numbers to provide a link to the TRAN file records. Otherwise, a pseudo-SSN is generated merely for processing and reporting purposes.

The next action is to format and queue the payment. The procedures FORMATPAYMT and INSERT are called. The latter is a fairly large, important procedure. Its chief function is to queue the payment in a manner fitting its size, and to initiate bilateral batching if it is large and circumstances permit.

Later in the outer block loop we see two other important procedures being invoked: TRYTORELEASE attempts to "release" queued payments of smaller size. The procedure CHECKBATCHES checks to see whether multilateral batching is possible at this time.

E. Hierarchy of Main Procedures

The most important procedures call each other as shown 10 in the following outline:
OUTERBLOCK
  FORMATPAYMT
  INSERT
    MAKEBILATERALBATCH
    REMOVE
  TRYTORELEASE
    GALESHAPLEY
    RELEASELOOP
      RELEASE
      REMOVE
      POSITIONCHECK
  CHECKBATCHES
    BATCHRELEASABLE
      CHECKSENDPAYMT
        CHECKSENDPAYMT
      CHECKRECVPAYMT
        CHECKRECVPAYMT
    BATCHRELEASE
      RELEASE RELEASEBILATERALBATCH
RELEASEBILATERALBATCH
RELEASE
REMOVE
REMOVE
POSITIONCHECK
PRINTSUMMARY F. Summary of Important Defines Probably the most important defines are those related to queue insertion and removal.

GETSYSLINK and FORGETSYSLINK are defines to create and destroy the link values that are used as actual indexes into the PAYMENTQUEUE array. They thus represent the memory management code for the PAYMENTQUEUE.

The various MASK defines are used for looping over subsets of the set of participants in an efficient manner. Thus, their main contribution is to reduce processor time below what it would be with more straightforward code.

The TREEGRP defines are to keep track of which groups appear below which in the trees of payments constructed during multilateral batching.

G. Some Further Features (1) Batching delay queue. Within procedure INSERT, the bilateral batching of a large payment is delayed by entering the large payments into a delay queue. The length of this queue is maintained at a nominal 400 payments.

Large payments may be used as helper payments in multilateral batching while they are in this delay queue, but they will not be used as the target payments to be multilaterally batched at that time.

(2) SFAIL, RFAIL in BATCHRELEASABLE and CHECKBATCHES.

This is another efficiency device. To avoid performing similar tree constructions on different target payments in BATCHRELEASABLE, a record is kept of failures to construct trees vs. the size of the payment for which the construction failed. The idea is that if a tree of helper payments cannot be found for one payment at a given time, then there is no point looking for a tree for an even larger payment at the same time. This assumption may not be 100% valid, but it is nearly so, and reduces the processing substantially.

(3) In CHECKSENDPAYMT and CHECKRECVPAYMT, the construction of trees of helper payments must proceed in such a way that positions at each GRP (participant) are within the limits for that participant. While this might be most easily done by requiring that a given GRP can occur in a tree once at most, this is not done. To obtain better results, the restriction is relaxed somewhat.

(a) A GRP can occur on a given tree branch at most once. This restriction is enforced by use of the TREEGRP defines.

(b) The quantity DNEXTPOS is calculated using values from DBATCHAMOUNT. This array contains the values of other payments in the proposed batch. In this way, the total effect of the batch on the position of a given GRP may be calculated in advance.

(4) In CHECKSENDPAYMT and CHECKRECVPAYMT, the choice of a next branch in the tree proceeds in two phases. In the first phase, phase zero, only single branches leaving a node are tried. This is to conserve helper payments, and to use the largest helper payments possible, on the theory that they are the most difficult to release if they become target payments later.

If phase 0 fails, then phase 1 occurs. Here an attempt is made to find several smaller payments which, taken together, have enough dollar volume to act as helper payments at the node in question. In this phase, no successive payment may be more than half as large as the one preceding (see PHASE1FACTOR). This is to spread the impact of the group over a wider range of payment sizes.

(5) BILATBATCHFACTOR. This factor, currently equal to two, restricts the initiation of bilateral batching of "large" payments to those that exceed the flow cap by the BILATBATCHFACTOR. The result is that more payments with size between the flow cap and twice the flow cap are available for service as helper payments in the multilateral batching. In any case, throughput seems to peak when this factor is equal to about two.

(6) Gale-Shapley Algorithm. The release of small payments proceeds without batching. When the positions of both sender and receiver allow, payments are released giving priority to the oldest payments. Small payments with a given sender and receiver are released in strict FIFO order from bilateral queues.

The judgment as to which payment to be released is the oldest is, or may be, different from the point of view of the receiver than from the sender. For this reason, the Gale-Shapley algorithm is used to produce a selection of payments to be released that is optimal for both senders and receivers.

While much the same effect could be obtained by simply trying to release the payments from the system queue, oldest first, the inventors have reason to believe that the present method is more economical of processor time.

(7) Payment flurries. The Gale-Shapley algorithm (above) checks whether a payment may be released by actually checking the positions of the sender and receiver against the size of the payment and the limits involved. This is sufficiently expensive to carry out that a means was devised to reduce the overhead involved. SENDERSTATE and RECEIVERSTATE masks are used to represent which participants may have a payment to send or receive. When the system is quietly awaiting the queuing of a new payment because all of the releases that are currently possible have been performed, both SENDERSTATE and RECEIVERSTATE are zero, or null. When a new payment is queued, the bit of SENDERSTATE representing the sending bank is set. Likewise, the bit of RECEIVERSTATE representing the receiving bank is set.

When the GALESHAPLEY procedure marks the payment for release, it acts to enable the release of further payments. Since the release of this payment will increase the position of the receiving bank, the procedure sets the bit of SENDERSTATE corresponding to the receiving bank. Likewise it sets the bit of RECEIVERSTATE corresponding to the sending bank. The outer block code calls GALESHAPLEY repeatedly until no more releases are possible without the queuing of additional payment orders. In this way, one new payment may result in many bits in these "state" masks being set, and a flurry of payments may be released before the outer block code asks for a new payment to queue. Just before attempting to queue a new payment, both the SENDERSTATE and RECEIVERSTATE masks are reset to zero, and the flurry (if any) has ended.

The invention has been described above in relation to its preferred embodiments. In a variation of the invention, the values of the minimum balance, opening balance, and maximum balance could be altered upwards or downwards for each participant without affecting the operation of the release algorithms significantly. In particular, the operation of the algorithm would be identical if the opening balance for each participant were zero, the minimum balance were minus the prefunded amount and the maximum balance were equal to the prefunded amount. In such a case, the available balance would, at each instant, be equal to the balance plus the prefunded amount. Thus, the present invention is not limited to the conventions adopted above regarding the balances, their maxima and their minima, since these are immaterial to within an additive constant, so far as the operation of the release algorithms is concerned. The present invention is in no way limited by the preferred embodiment.

Of course, it will be appreciated that the invention may take forms other than those specifically described, and the scope of the invention is to be determined solely by the following claims.

What is claimed is:

1. A system for continuous intraday final settlement of payment orders among a plurality of financial-institution participants, each having an associated satellite computer station operable to transmit payment orders electronically and each being operable to function as a payment receiving participant and a payment sending participant; said system comprising:

(a) a central controlling agent, including a central computer operable to communicate electronically with the satellite computer stations of the plurality of participants to receive payment orders therefrom, and to control release of payment orders among the plurality of participants; and (b) means for storing a plurality of prefunded balances in a prefunded balance account, each balance representing the right of one of the participants to payment from the prefunded balance account and containing an initial prefunded balance for each participant at a start of each business day, wherein said central computer is operable on a continuous basis:

(1) upon receipt of a payment order by said central controlling agent from one of said participants, operating as a sending participant, for payment to another of said participants, operating as a receiving participant, to categorize each received payment order as small if it is less than a predetermined percentage of one of the initial prefunded balance for the associated sending participant and the initial prefunded balance for the associated receiving participant, and as large otherwise;

(2) to store the received payment order in a queue maintained by said central computer;

(3) to monitor the queue for previously stored small payment orders as candidates for immediate release for payment;

(4) to determine if release of a candidate small payment order for payment will cause available balances for both the sending participant and the receiving participant associated with the candidate small payment order to fall within respective predetermined limits;

(5) if the determination in step (4) is positive, to release the candidate small payment order by debiting the available balance of the sending participant and crediting the available balance of the receiving participant by the amount of the associated candidate small payment order;

(6) to monitor the queue for previously stored target large payment orders for payment from a sending participant to a receiving participant;

(7) to release a target large payment order stored in the queue by performing multilateral batching (i) by forming a first tree comprised of the target payment order and, if necessary, helper payment orders in a direction towards the sending participant of the target payment order, from at least one sending participant other than the sending participant of the target large payment order; (ii) by forming a second tree comprised of the target payment order and, if necessary, helper payment orders in a direction away from the receiving participant of the large target payment order, to at least one receiving participant other than the receiving participant of the target payment order; (iii) debiting the available balances of the sending participant of the target large payment order and of the sending participants of the helper payment orders in a multilateral batch comprising the target and helper payment orders of the first and second trees by the amounts of each respective payment order; and (iv) crediting the balances of the receiving participant of the target large payment and of the receiving participants of the helper payment orders in the multilateral batch by the amounts of the respective payment orders; the multilateral batch having been chosen so that after the payment orders comprising the first and second trees are released, the resulting position in the available balance of each participant involved in the multilateral batching falls within predetermined limits.

2. The system according to claim 1, wherein the central computer system is operable to selectively offset, in a bilateral batch, the amount of a target large payment order by searching the queue for a previously queued second payment order from the associated receiving participant of the target large payment order; to generate a pseudo-payment order in an amount of a net difference between the target large payment order and the second payment order; and to store the pseudo-payment order in the queue.

3. The system according to claim 2, wherein the central computer is operable to select the second payment order in the bilateral batch within a range between half as large as the target large payment order of the bilateral batch and twice as large as the target large payment order.

4. The system according to claim 1, wherein the central computer is operable to select small payment orders for release from the queue in accordance with a first-in first-out queue discipline.

5. The system according to claim 4, wherein the central computer is operable to select small payment orders for release from the queue in accordance with the Gale-Shapley algorithm.

6. The system according to claim 1, wherein the central computer selects the predetermined percentage for categorizing queued payment orders as small payment orders to be 80% of the lesser of the initial prefunded balance for the associated sending participant and the initial prefunded balance for the associated receiving participant.

7. The system according to claim 1, wherein the central computer is operable to set the predetermined limits such that the available balance of any of the prefunded balances cannot exceed 200% of the initial prefunded balance or go below zero.

8. The system according to claim 1, wherein the small category of payment orders is divided into subcategories medium and very small, wherein only large and medium payment orders are eligible to become helper payment orders.

9. The system according to claim 8, wherein the queue comprises a plurality of queues, and wherein very small, medium and large payment orders are stored in various ones of said plurality of queues on the basis of the size of the respective payment orders.

10. A method for continuous intraday final settlement of payment orders among a plurality of financial-institution participants, each having an associated satellite computer station operable to transmit payment orders electronically and each being operable to function as a payment receiving participant and a payment sending participant by a central controlling agent including a central computer operable to communicate electronically with the satellite computer stations of the plurality of participants to receive payment orders therefrom, and to control release of payment orders among the plurality of participants; and means for storing a plurality of prefunded balances in a prefunded balance account, each balance representing the right of one of the participants to payment from the prefunded balance account and containing an initial prefunded balance at a start of each business day, said method comprising the steps of:

(1) upon receipt of a payment order by the central controlling agent from one of the participants, operating as a sending participant, for payment to another of the participants, operating as a receiving participant, categorizing each received payment order as small if it is less than a predetermined percentage of one of the initial prefunded balance for the associated sending participant and the initial prefunded balance for the associated receiving participant, and as large otherwise;

(2) storing the received payment order in a queue maintained by the central computer;

(3) monitoring the queue for previously stored small payment orders as candidates for immediate release for payment;

(4) determining if release of a candidate small payment order for payment will cause available balances for both the sending participant and the receiving participant associated with the candidate small payment order to fall within respective predetermined limits;

(5) if the determination in step (4) is positive, releasing the candidate small payment order by debiting the available balance of the sending participant crediting the available balance of the receiving participant by the amount of the associated candidate small payment order;

(6) monitoring the queue for previously stored target large payment orders for payment from a sending participant to a receiving participant;

(7) releasing a target large payment order stored in the queue by performing multilateral batching (i) by forming a first tree comprised of the target payment order and, if necessary, helper payment orders in a direction towards the sending participant of the target payment order, from at least one sending participant other than the receiving participant of the target large payment order; (ii) by forming a second tree comprised of the target payment order and, if necessary, helper payment orders in a direction away from the receiving participant of the large target payment order, to at least one receiving participant other than the receiving participant of the target payment order; (iii) debiting the available balances of the sending participant of the target large payment order and of the sending participants of the helper payment orders in a multilateral batch comprising the target and helper payment orders of the first and second trees by the amounts of each respective payment order; and (iv) crediting the balances of the receiving participant of the target large payment and of the receiving participants of the helper payment orders in the multilateral batch by the amounts of the respective payment orders; the multilateral batch having been chosen so that after the payment orders comprising the first and second trees are released, the resulting position in the available balance of each participant involved in the multilateral batching falls within predetermined limits.

11. The method according to claim 10, further comprising the steps of:

selectively offsetting, in a bilateral batch, the amount of the target large payment order by searching the queue for a previously queued second payment order from the associated receiving participant of the target large payment order;

generating a pseudo-payment order in an amount of a net difference between the target large payment order and the second payment order; and storing the pseudo-payment order in the queue.

12. The method according to claim 11, wherein the second payment order in the bilateral batch must fall within a range between half as large as the target large payment order of the bilateral batch and twice as large as the target large payment order.

13. The method according to claim 10, wherein small payment orders are selected for release from the queue in accordance with a first-in first-out queue discipline.

14. The method according to claim 13, wherein small payment orders are selected for release from the queue in accordance with the Gale-Shapley algorithm.

15. The method according to claim 10, wherein the predetermined percentage for categorizing queued payment orders as small payment orders is selected to be 80% of the lesser of the initial prefunded balance for the associated sending participant and the initial prefunded balance for the associated receiving participant.

16. The method according to claim 10, wherein the predetermined limits are set such that the available balance of any of the prefunded balances cannot exceed 200% of the initial prefunded balance or go below zero.

17. The method according to claim 10, wherein the small category of payment orders is divided into subcategories medium and very small, wherein only large and medium payment orders are eligible to become helper payment orders.

18. The method according to claim 17, wherein the queue comprises a plurality of queues, and wherein very small, medium and large payment orders are stored in various ones of said plurality of queues on the basis of the size of the respective payment orders.

19. A computer-readable medium storing code executable by a central computer, the code controlling the central computer to perform a method for continuous intraday final settlement of payment orders among a plurality of financial-institution participants, each having an associated satellite computer station operable to transmit payment orders electronically and each being operable to function as a payment receiving participant and a payment sending participant, the central computer forming a part of a central controlling agent and being operable to communicate electronically with the satellite computer stations of the plurality of participants to receive payment orders therefrom, to control release of payment orders among the plurality of participants, and to control means for storing a plurality of prefunded balances in a prefunded balance account, each balance representing the right of one of the participants to payment from the prefunded balance account and containing an initial prefunded balance for each participant at a start of each business day, the method comprising the steps of:

(1) upon receipt of a payment order by the central controlling agent from one of the participants, operating as a sending participant, for payment to another of the participants, operating as a receiving participant, categorizing each received payment order as small if it is less than a predetermined percentage of one of the initial prefunded balance for the associated sending participant and the initial prefunded balance for the associated receiving participant, and as large otherwise;

(2) storing the received payment order in a queue maintained by the central computer;

(3) monitoring the queue for previously stored small payment orders as candidates for immediate release for payment;

(4) determining if release of a candidate small payment order for payment will cause available balances of both the sending participant and the receiving participant associated with the candidate small payment order to fall within respective predetermined limits;

(5) if the determination in step (4) is positive, releasing the candidate small payment order by debiting the available balance of the sending participant and crediting the available balance of the receiving participant by the amount of the associated candidate small payment order;

(6) monitoring the queue for previously stored target large payment orders for payment from a sending participant to a receiving participant;

(7) releasing a target large payment order stored in the queue by performing multilateral batching (i) by forming a first tree comprised of the target payment order and, if necessary, helper payment orders in a direction towards the sending participant of the target payment order, from at least one sending participant other than the sending participant of the target large payment order; (ii) by forming a second tree comprised of the target payment order and, if necessary, helper payment orders in a direction away from the receiving participant of the target large payment order, to at least one receiving participant other than the receiving participant of the target payment order; (iii) debiting the available balances of the sending participant of the target large payment order and of the sending participants of the helper payment orders in a multilateral batch comprising the target and helper payment orders of the first and second trees by the amounts of each respective payment order; and (iv) crediting the available balances of the receiving participant of the target large payment and of the receiving participants of the helper payment orders in the multilateral batch by the amounts of the respective payment orders; the multilateral batch having been chosen so that after the payment orders comprising the first and second trees are released, the resulting position in the available balance of each participant involved in the multilateral batching falls within predetermined limits.

20. The computer-readable medium according to claim 19, further comprising code to cause the central computer to perform the steps of:

selectively offsetting, in a bilateral batch, the amount of the target large payment order by searching the queue for a previously queued second payment order from the associated receiving participant of the target large payment order;

generating a pseudo-payment order in an amount of a net difference between the target large payment order and the second payment order; and storing the pseudo-payment order in the queue.

21. The computer-readable medium according to claim 20, wherein the second payment order in the bilateral batch must fall within a range between half as large as the target large payment order of the bilateral batch and twice as large as the target large payment order.

22. The computer-readable medium according to claim 19, wherein small payment orders are selected for release from the queue in accordance with a first-in first-out queue discipline.

23. The computer-readable medium according to claim 22, wherein small payment orders are selected for release from the queue in accordance with the Gale-Shapley algorithm.

24. The computer-readable medium according to claim 19, wherein the predetermined percentage for categorizing queued payment orders as small payment orders is selected to be 80% of the lesser of the initial prefunded balance for the associated sending participant and the initial prefunded balance for the associated receiving participant.

25. The computer-readable medium according to claim 19, wherein the predetermined limits are set such that the available balance of any of the prefunded balances cannot exceed 200% of the initial prefunded balance or go below zero.

26. The computer-readable medium according to claim 19, wherein the small category of payment orders is divided into subcategories medium and very small, wherein only large and medium payment orders are eligible to become helper payment orders.

27. The computer-readable medium according to claim 26, wherein the queue comprises a plurality of queues, and wherein very small, medium and large payment orders are stored in various ones of said plurality of queues on the basis of the size of the respective payment orders.

* * * * *

UNITED STATES PATENT AND TRADEMARK OFFICE
CERTIFICATE OF CORRECTION

PATENT NO. : 6,076,074
DATED : June 13, 2000
INVENTOR(S) : Robert M. Cotton et al.

It is certified that error appears in the above-identified patent and that said Letters Patent is hereby corrected as shown below:

Column 9,
Line 17, "would" should read -- could --.

Column 24,
Line 46, "$A_3$," should read -- $A_{31}$ --.

Column 28,
Line 36, "follows" should read -- follows: --.

Column 29,
Line 17, "payment" should read -- payment. --.

Column 33,
Lines 28 and 43, "To" should read -- $T_O$ --; and
Line 58, "following" should read -- following. --.

Column 35,
Line 3, "of" should read -- of: --; and
Line 8, "processing." should read -- processing --.

Column 36,
Line 39, "resulting-in" should read -- resulting in --; and
Table VI, "it" should read -- is --.

Column 38,
Line 33, "SYSLINCK(LINK) ← AVAILLINK AVAILLINK ← LINK" should read
-- SYSLINCK(LINK) ← AVAILLINK
        AVAILLINK ← LINK --.

Column 39,
Lines 58 and 64, "i.e." should read -- i.e., --.

Column 43,
Line 21, "receiver," should read -- receiver --.

Column 51,
Line 6, "TYRTORELEASE," should read -- TRYTORELEASE, --; and
Line 66, "as" should read -- has --.

UNITED STATES PATENT AND TRADEMARK OFFICE
CERTIFICATE OF CORRECTION

PATENT NO. : 6,076,074
DATED : June 13, 2000
INVENTOR(S) : Robert M. Cotton et al.

It is certified that error appears in the above-identified patent and that said Letters Patent is hereby corrected as shown below:

Column 56,
Line 63, "is-within" should read -- is within --.

Column 58,
Line 47, "10" should be deleted.

Signed and Sealed this

Thirty-first Day of January, 2006

JON W. DUDAS
*Director of the United States Patent and Trademark Office*